United States Patent [19]

Buma et al.

[11] Patent Number: 4,714,271

[45] Date of Patent: Dec. 22, 1987

[54] SUSPENSION CONTROLLER

[75] Inventors: Shuuichi Buma, Toyota; Toshio Onuma, Susono; Kaoru Ohashi, Okazaki; Masami Itou, Toyota, all of Japan

[73] Assignee: Toyota Jidosha Kabushiki Kaisha, Toyota, Japan

[21] Appl. No.: 916,721

[22] Filed: Oct. 8, 1986

[30] Foreign Application Priority Data

Oct. 26, 1985 [JP] Japan .................. 60-239776

[51] Int. Cl.$^4$ .............................................. B60G 9/00
[52] U.S. Cl. .................... 280/707; 364/424
[58] Field of Search .............. 280/6 R, 6.1, 6 H, 707, 280/689, 772; 180/41; 364/424

[56] References Cited

U.S. PATENT DOCUMENTS 4,468,739  8/1984  Woods et al. ............... 280/707
4,589,676  5/1986  Meloche et al. ............. 280/707
4,639,014  1/1987  Tanaka et al. .............. 280/6 H

FOREIGN PATENT DOCUMENTS 60-183216  9/1985  Japan .
2119473   11/1983  United Kingdom .
2135020    8/1984  United Kingdom .
2150258    6/1985  United Kingdom .

OTHER PUBLICATIONS

Patent Abstracts of Japan, vol. 9, No. 152, (M-391) [1875], 27th Jun. 1985; and JP-A-60 29317, (Nissan) 14-02-1985.

Primary Examiner—John J. Love
Assistant Examiner—Ross Weaver
Attorney, Agent, or Firm—Oblon, Fisher, Spivak, McClelland & Maier

[57] ABSTRACT

A suspension controller for providing improved ride comfort and stable drivability with the suspension characteristic altered responsive to the condition of a road surface and a running vehicle speed. The suspension controller includes a vehicle height detection mechanism for providing a vehicle height signal indicative of a distance between a body and a wheel of a vehicle; a vehicle speed detection mechanism for providing a vehicle speed signal; a vehicle height determination mechanism for providing a soft signal commanding alteration of the suspension characteristic to soft in case the detected vehicle height exceeds a predetermined value; a vehicle speed determination mechanism for providing both soft and hard signals in response to the detected vehicle speed; a preference mechanism for providing a preference for a signal from the vehicle height determination mechanism over that from the vehicle speed determination mechanism to a suspension characteristic alteration mechanism so that the suspension characteristic is properly altered.

12 Claims, 36 Drawing Figures

FIG. 8

| CONVERTED VALUE Hm | OUTPUT VALUE | VEHICLE HEIGHT |
|---|---|---|
|  |  | FULL REBOUND |
| 26 | 16 | |
| 22 | 15 | |
| 19 | 14 | |
| 18 | 13 | HIGH |
| 17 | 12 | |
| 16 | 11 | |
| 15 | 10 | |
| 14 | 9 | NORMAL |
| 13 | 8 | |
| 12 | 7 | |
| 11 | 6 | |
| 10 | 5 | LOW |
| 9 | 4 | |
| 8 | 3 | |
| 5 | 2 | |
| 1 | 1 | |
|  |  | FULL BOUND |

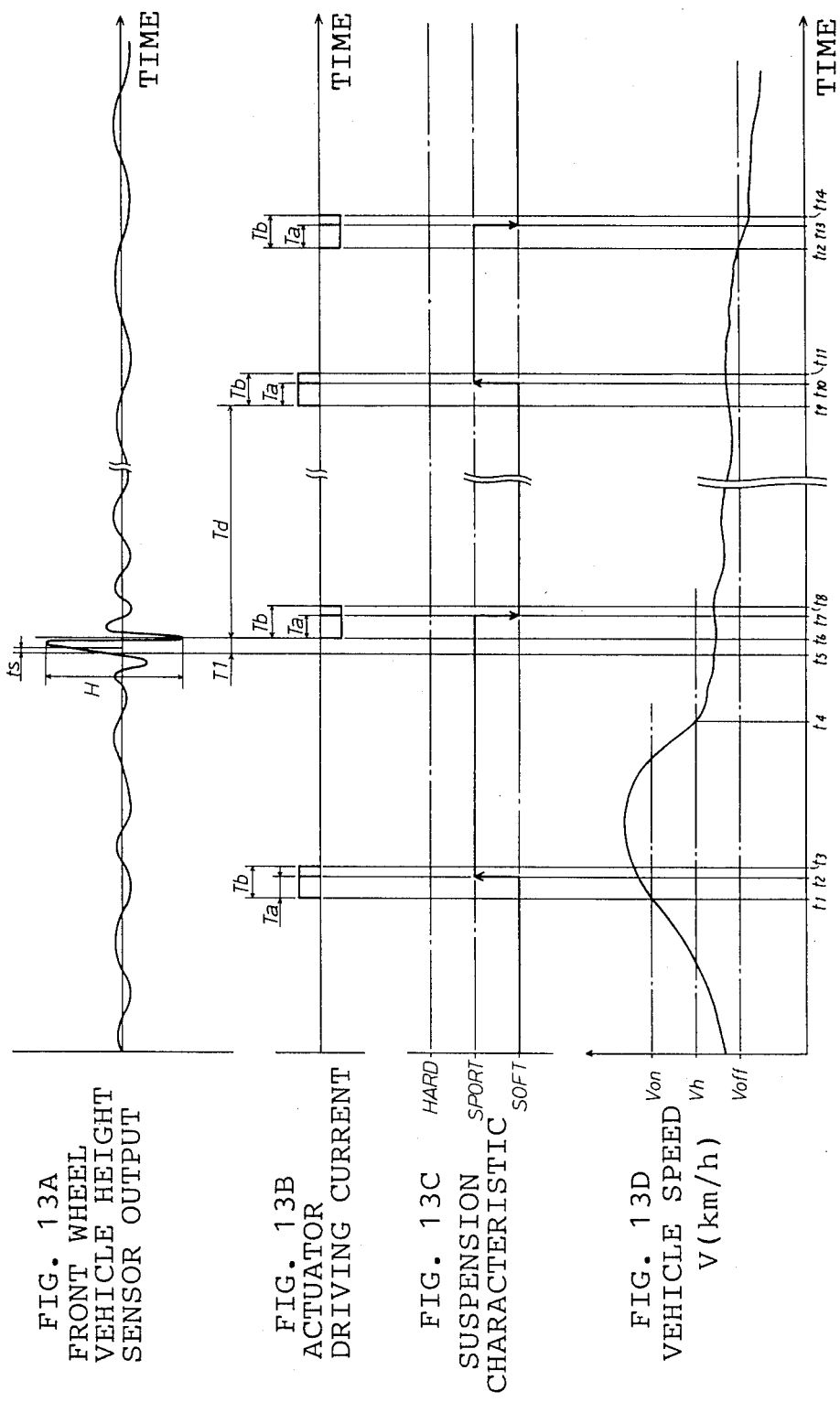

[4,714,271]

SUSPENSION CONTROLLER

BACKGROUND OF THE INVENTION

1. Field of the Invention

The present invention relates to a suspension controller, more particularly, to a suspension controller for altering suspension characteristic responsive to road surface conditions and vehicle running speed.

2. Description of the Related Art

When a vehicle is running at a low speed, generally, a suspension characteristic is to be maintained in a soft state to improve the ride comfort by decreasing the spring constant or damping force. On the other hand, when the vehicle is running at a high speed, the suspension characteristic is to be maintained in a hard state to improve control and stability by increasing the spring constant or damping force. Accordingly, various types of the suspension controllers for altering the suspension characteristic in response to the running speed of the vehicle have been proposed.

However, the aforementioned suspension controllers have brought such disadvantages as hunting in controlling the variable suspension characteristic because the vehicle speeds in both starting and terminating the suspension control are set to be the same. To cope with the above disadvantage, the vehicle speed value in starting the suspension control is set to be greater than that in terminating, or, in case the suspension control is executed at a single predetermined vehicle speed, a delay period is to be set in terminating the suspension control. For example, in Published Japan Patent Application No. sho 58-56907 entitled "Controller for Damping Force of Suspension", the suspension controller is provided with a vehicle speed detection means for detecting the actual vehicle speed, a high vehicle speed detection means for detecting whether the detected vehicle speed is a predetermined high vehicle speed to increase the damping force of the suspension to be above a predetermined high damping force, a low vehicle speed detection means for detecting whether the detected vehicle speed is a predetermined low vehicle speed for decreasing the damping force to be below a predetermined low damping force, and a maintenance means for maintaining the condition of the suspension to which the damping force is adjusted in response to the output from the high vehicle speed detection means or the low vehicle speed detection means. The suspension controller employs a timer for delaying the adjustment of the damping force of the suspension by a predetermined period when at least the decreasing vehicle speed is below a predetermined low vehicle speed.

However, the suspension controller according to the prior art possesses the following problems:

When a vehicle speed is increased to be not less than the predetermined high vehicle speed value, the suspension characteristic is altered to a hard state. In case the vehicle speed is decreased to be within the range which is below the predetermined high vehicle speed value and not less than the predetermined low vehicle speed value, the suspension characteristic is maintained in the hard state. With the above condition, if the vehicle passes over a single bump or dip, the shock being exerted on the vehicle body is not sufficiently absorbed, resulting in reduced ride comfort.

Since the conventional suspension control is executed only in response to the vehicle speed, if the vehicle passes over a single bump or dip with a speed in the vicinity of a border between the predetermined low vehicle speed and the high vehicle speed, the ride comfort is also reduced.

SUMMARY OF THE INVENTION

An object of the present invention is to provide a suspension controller for altering the suspension characteristic in response to a vehicle speed and a road surface on which the vehicle runs.

Another object of the invention is to provide improved ride comfort with shocks being exerted on the vehicle body being absorbed by altering the suspension characteristic from a hard to soft state.

A further object of the invention is to provide stable drivability by altering the suspension characteristic not only in response to both the vehicle speed and the vehicle height, but also to the road surface condition.

A still further object of the invention is to provide more freedom in designing the suspension system whose characteristic is hardly limited, since it is altered in response to the vehicle speed and the road surface condition.

These objects and aspects of the invention will be apparent from the following description.

The suspension controller according to the present invention includes a vehicle height detection means for providing a vehicle height signal representative of a vehicle height, a vehicle speed detection means for providing a vehicle speed signal representative of a vehihcle speed, a vehicle height determination means for providing a first soft signal indicative of an alteration of the variable suspension means to a soft state before a rear wheel reaches a front wheel position where a change in the vehicle height signal within a predetermined period exceeds a predetermined value while the vehicle speed signal is within a predetermined speed range, a vehicle speed determination means for providing a hard signal representative of alteration of the variable suspension to a harder state when the vehicle speed signal exceeds a first reference speed signal and for providing a second soft signal representative of alteration of the variable suspension to a softer state when the vehicle speed signal is less than a second reference speed signal which is set to be less than the first reference speed signal, and a preference means responsive to the vehicle height determination means and vehicle speed determination means for providing a preference for the first soft signal to the suspension means over the hard signal and second soft signal when the vehicle speed signal is within an overlapped range in which the predetermined speed range overlaps a range between the second reference speed and the first reference speed.

The vehicle speed detection means designated as M1 detects a distance between a vehicle wheel and a vehicle body as a vehicle height. It may be constructed such that a displacement of a suspension arm to the vehicle body is converted to rotation of a rotational mass to be detected by a potentiometer and output as an analog signal. The converted rotation of the rotational mass may be detected by a well-known rotary encoder to be output as a digital signal.

The vehicle speed detection means designated as M2 detects the vehicle speed. For example, it may be constructed such that a rotational speed of a drive shaft is measured by an electromagnetic pick-up, a switch or an optical sensor which are arranged in the vicinity of the drive shaft for transmitting an output from an internal combustion engine of the vehicle so that a vehicle speed can be detected based on the measured value.

The suspension characteristic alteration means designated as M3 alters the suspension characteristic. It may be constructed such that a spring constant, a damping force of a shock absorber, a bush characteristic, or a stabilizer characteristic are altered in a stepless manner or by a plurality of steps. Accordingly, the spring constant can be increased or decreased with a main gas chamber communicated with or shut off from an auxiliary gas chamber in an air suspension. The damping force can be increased or decreased by altering a radius of an orifice through which the oil of the shock absorber flows. It may instead by constructed to alter the suspension characteristic to such states as hard, sport, or soft by changing the rigidity of the bush or the stabilizer.

The vehicle height determination means designated as M4 outputs the command to alter the suspension characteristic to soft state before a rear wheel reaches a front wheel position where the detected vehicle height displacement within the predetermined period exceeds a predetermined value. It may be constructed such that the detected vehicle speed is determined as to whether it is within a predetermined range by the output signal from the vehicle height sensor. Then, the suspension characteristic is altered to soft state before the rear wheel reaches the front wheel position where the difference between the maximum and minimum values of the detected vehicle speed within predetermined time interval exceeds a predetermined alteration determination value.

The vehicle speed determination means designated as M5 outputs commands for altering the suspension characteristic to sport state in case the detected vehicle speed exceeds the first vehicle speed and to soft state in case the detected vehicle speed is below the second vehicle speed which is set to be slower than that of the first vehicle speed. If may be constructed that both the first and the second vehicle speeds are previously stored to be compared with the detected vehicle speed so that the command for altering the suspension characteristic is to be output in response to the compared results.

The preference means designated as M6 outputs the command from the vehicle height determination means M4 to the suspension characteristic alteration means M3 in preference to that from the vehicle speed determination means M5 in case the detected vehicle speed is within the range from the second vehicle speed set in the above vehicle speed determination means M5 to the upper limit vehicle speed set in the above vehicle height determination means M4.

The vehicle height determination means M4, the vehicle speed determination means M5 and the preference means M6 can be applied as an independent discrete logic circuit, respectively. It may be constructed as a logic artithmetic circuit along with CPU, ROM, RAM and other peripheral circuit elements to output the command to the suspension characteristic alteration means M3.

In the suspension controller of the present invention, the vehicle height determination means M4 outputs the command to alter the suspension characteristic to soft state before the rear wheel reaches the front wheel position when the detected vehicle speed is within the predetermined range and the change in the detected vehicle height is above the predetermined value. The vehicle speed determination means M5 outputs the command to alter the suspension characteristic to sport state in case the detected vehicle speed exceeds the first vehicle speed, and in case the decelerating vehicle speed is above the second vehicle speed value which is set to be smaller than the first vehicle speed. The preference means M6 transmits the output command from the vehicle height determination means M4 to the suspension characteristic alteration means M3 in preference to that from the vehicle speed determination means M5, in case the detected vehicle speed is within the range from the second vehicle speed set in the above vehicle speed determination means M5 and the upper limit vehicle speed set in the above vehicle height determination means M4.

When the vehicle speed exceeds the first vehicle speed, the suspension characteristic is altered to sport state. Accordingly, when the vehicle speed is decreased to be within the range which is not less than the second vehicle speed and less than the upper limit vehicle speed, and the change value in the vehicle height within the predetermined time interval is above the predetermined value, the command from the vehicle height determination means M4 is preferentially transmitted to the suspension characteristic alteration means M3 by the preference means M6, whereby the suspension characteristic is altered to soft state.

The suspension controller of the present invention controls in such a manner as to alter the suspension characteristic to sport state in case the vehicle speed exceeds the first vehicle speed, and to soft state in case the vehicle speed is below the second vehicle speed. When the vehicle speed is decreased to be within the range which is not less than the second vehicle speed and less than the upper limit vehicle speed, if the change value of the vehicle height is determined to be above the predetermined value, the suspension characteristic is altered to soft state. Thus, the technological theme of the present invention is attained by the operation of the respective construction of the above suspension controller.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements, and wherein:

FIG. 8 is a table which defines the relationship between the vehicle height sensor output value and the vehicle height converted value;

FIG. 13A is a timing chart showing the change in output from the front vehicle height sensor;

FIG. 13B is a timing chart showing the change in driving current of the suspension characteristic alteration actuator;

FIG. 13C is a timing chart showing the change in the suspension characteristic;

FIG. 13D is a timing chart showing the change in the vhicle speed;

DESCRIPTION OF THE PREFERRED EMBODIMENTS

Hereinafter, preferred embodiments will be described in detail according to the drawings.

Figure 1:
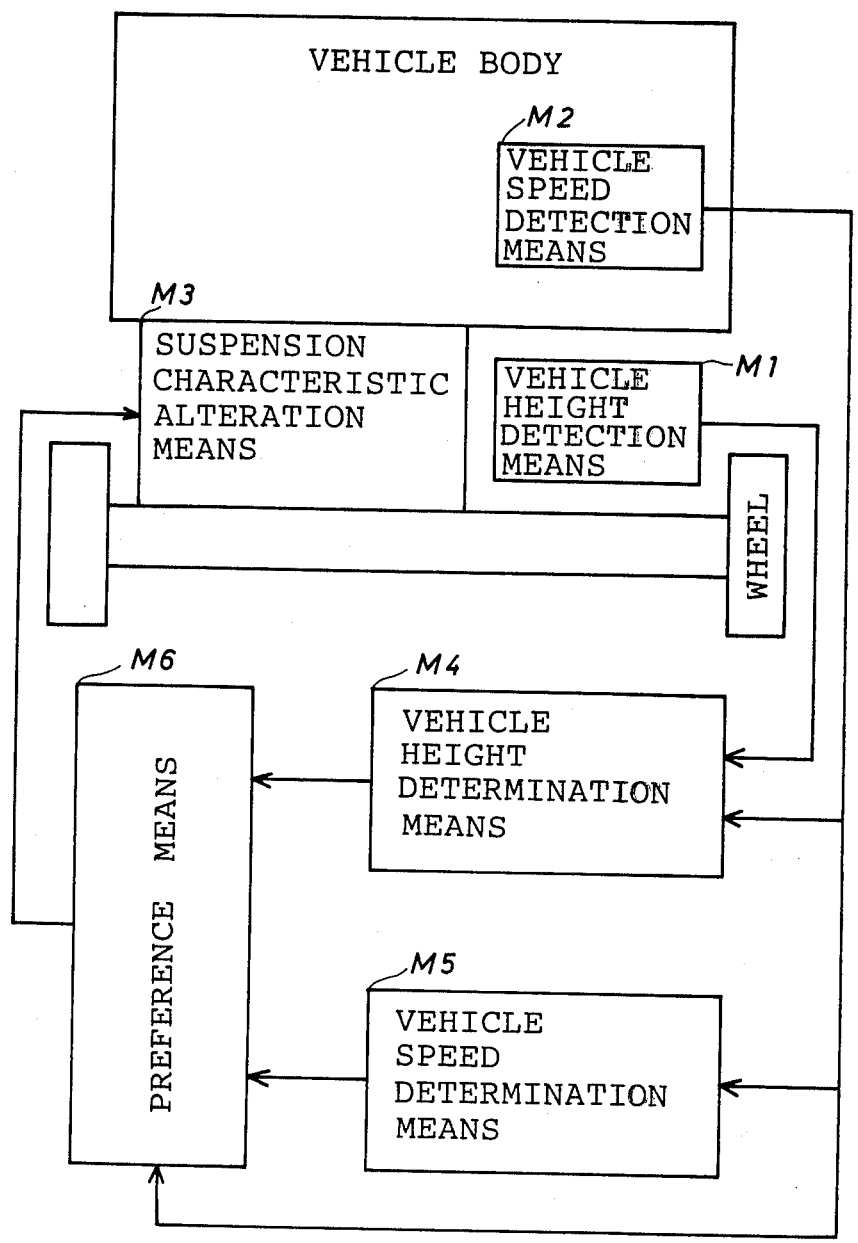
FIG. 1 is a schematic view of a basic structure embodying the present invention.
Figure 2:
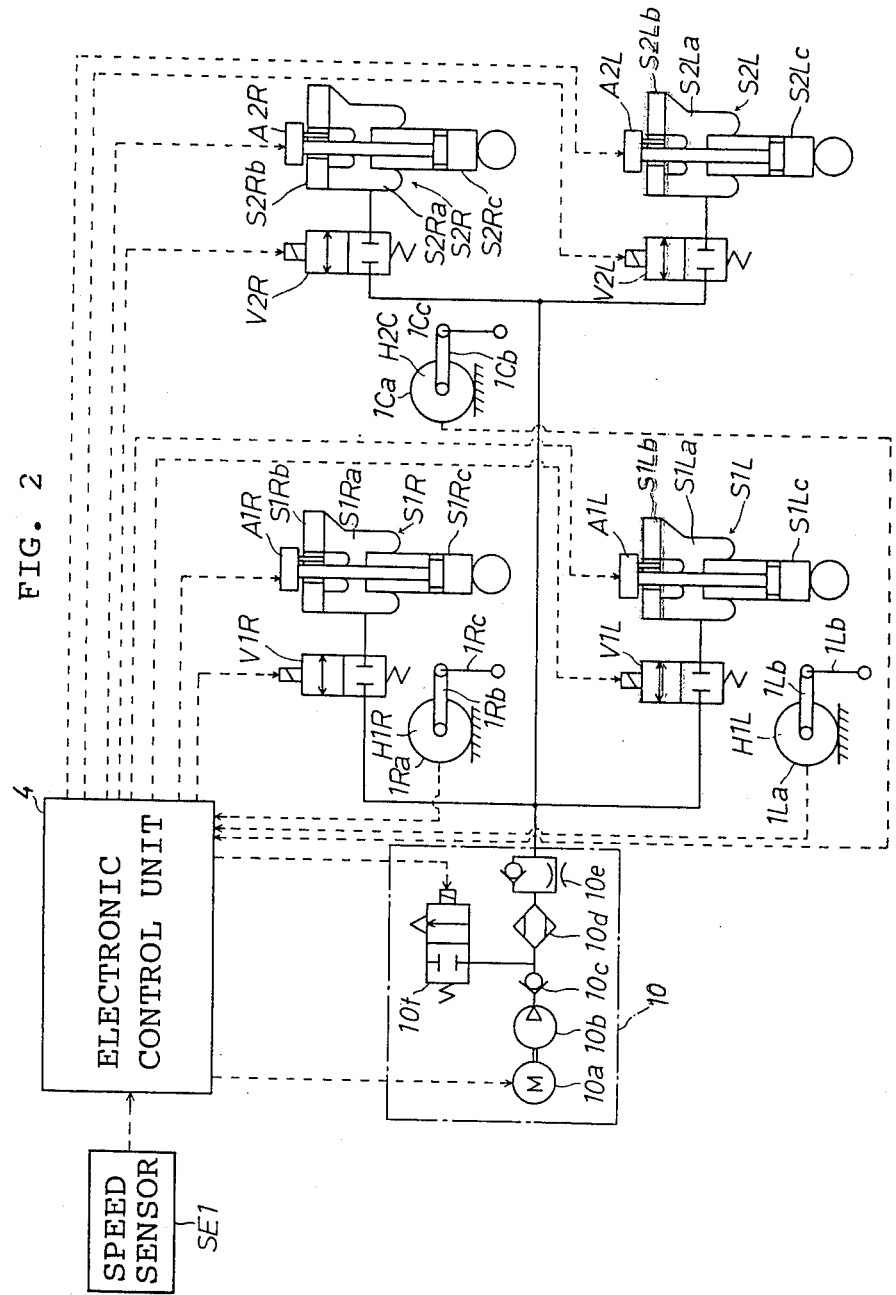
FIG. 2 is a systematic view illustrating a suspension controller of a first preferred embodiment according to the invention.

FIG. 2 shows details of a suspension controller for a vehicle, having air suspensions, according to the first embodiment of the invention. A right front vehicle height sensor H1R is provided between a vehicle body and a right front wheel to detect the distance between the vehicle body and a right suspension arm which follows the motion of the wheel. A left front vehicle height sensor H1L is provided between the vehicle body and a left front wheel to detect the distance between the vehicle body and a left suspension arm. A rear vehicle height sensor H2C is provided between the vehicle body and a rear wheel to detect the distance between the vehicle body and a rear suspension arm. Short cylindrical bodies 1Ra, 1La and 1Ca of the vehicle height sensors H1R, H1L and H2C are secured on the vehicle body. Links 1Rb, 1Lb and 1Cb extend substantially perpendicularly from each center shaft of the bodies 1Ra, 1La and 1Ca. Turnbuckles 1Rc, 1Lc and 1Cc are rotatably coupled to each one end of the links 1Rb, 1Lb and 1Cb opposite the bodies 1Ra, 1La and 1Ca, respectively. The other ends of the turnbuckles 1Rc, 1Ld and 1Cc opposite the links are rotatably coupled to parts of the suspension arms.

A plurality of light interrupters are provided with the vehicle height sensors H1R, H1L and H2C for detecting the vehicle height change as 4-bit data by operating a disc so as to switch on and off the light interrupters in response to changes in the vehicle height, thus outputting a digital signal.

Set fourth below is an explanation of air suspension members S1R, S1L, S2R and S2L. The air suspension member S2L is provided between the left rear suspension arm and the vehicle body in parallel with a suspenison spring (not shown). The air suspension member S2L includes a main gas chamber S2La functioning as an air spring, an auxiliary gas chamber S2Lb, a shock absorber S2Lc, and an actuator A2L for altering the spring constant of the air spring and the damping force of the shock absorber. Other air suspension members S1R, S1L and S2R have a similar construction and function as the air suspension member S2L, and are provided for the right front wheel, the left front wheel, and the right rear wheel, respectively.

A compressed air feed and discharge system 10 connected to each air spring of the air suspension members S1R, S1L, S2R and S2L operates a motor 10a to drive a compressor 10b for generating compressed air. The compressed air blows from the compressor 10b to an air drier 10d via a check valve 10c. The air drier 10d dries the compressed air supplied for the air suspension members S1R, S1L, S2R and S2L, and protects every part of the air suspension members S1R, S1L, S2R and S2L from moisture. The air drier 10d also prevents abnormal pressure changes which would otherwise accompany phase changes in the main gas chambers S1Ra, S1La, S2Ra and S2La and auxiliary gas chambers S1Rb, S1Lb, S2Rb and S2Lb of the air suspensions. Via a check valve 10e, the compressed air flows from the compressor 10b to the air suspensions S1R, S1L, S2R and S2L. The check value 10e checking portion opens in feeding the compressed air, and closes in discharging the compressed air, thus discharging the compressed air only through the fixed portion. A discharging valve 10f is an electromagnetic value of a 2-port 2-position spring off-set type. The discharging valve 10f is normally in the closed position shown in FIG. 2. When discharging the compressed air from the air suspension members S1R, S1L, S2R and S2L, the valve 10f opens to discharge the compressed air to the atmosphere via the check valve 10e and the air drier 10d.

Air spring feed and discharge valves V1R, V1L, V2R and V2L have the functions of adjusting the vehicle height, and are provided between the air suspension members S1R, S1L, S2R and S2L and the above-mentioned compressed air feed and discharge system 10, respectively. The air spring feed and discharge valves V1R, V1L, V2R and V2L are electromagnetic valves of a 2-port 2-position spring off-set type. These valves are normally in the closed positions shown in FIG. 2, and are opened in adjusting the vehicle height. When the air spring feed and discharge valves V1R, V1L, V2R and V2L are open, the main gas chambers S1Ra, S1La, S2Ra and S2La are connected with the compressed air feed and discharge system 10. If the compressed air is fed from the system 10, the volumes in the main gas chambers S1Ra, S1La, S2Ra and S2La are increased so as to raise the vehicle height, and if the air is discharged because of the vehicle weight itself, the volumes thereof are decreased so as to lower the vehicle height. On the other hand, if the feed and discharge valves V1R, V1L, V2R and V2L are closed, the vehicle height remains unchanged. As described above, it is possible to change the volumes of the main gas chambers S1Ra, S1La, S2Ra and S2La of the air suspensions so as to adjust the vehicle height by connecting and disconnecting the discharge valve 10f with/from the air spring feed and discharge valves V1R, V1L, V2R and V2L.

A speed sensor SE1 is provided, for example, by a speedometer, and outputs a pulse in response to the vehicle speed. The signals output from the vehicle height sensors H1R, H1L, H2C and the speed sensor SE1 are input to an Electronic Control Unit (ECU) 4. The ECU 4 derives data from the signals processes them and outputs control signals to the actuators A1R, A1L, A2R and A2L of the air suspensions, to the air spring feed and discharge valves V1R, V1L, V2R and V2L, and to the motor 10a and the discharging valve 10f of the compressed air feed and discharge system 10 so as to optimally control them.

Set forth below is an explanation of the main part of the air suspension members S1R, S1L, S2R and S2L based on FIGS. 3 and 4. Since each suspension has the same construction as the others, only the right rear air suspension member S2R is here described in detail.

Figure 3:
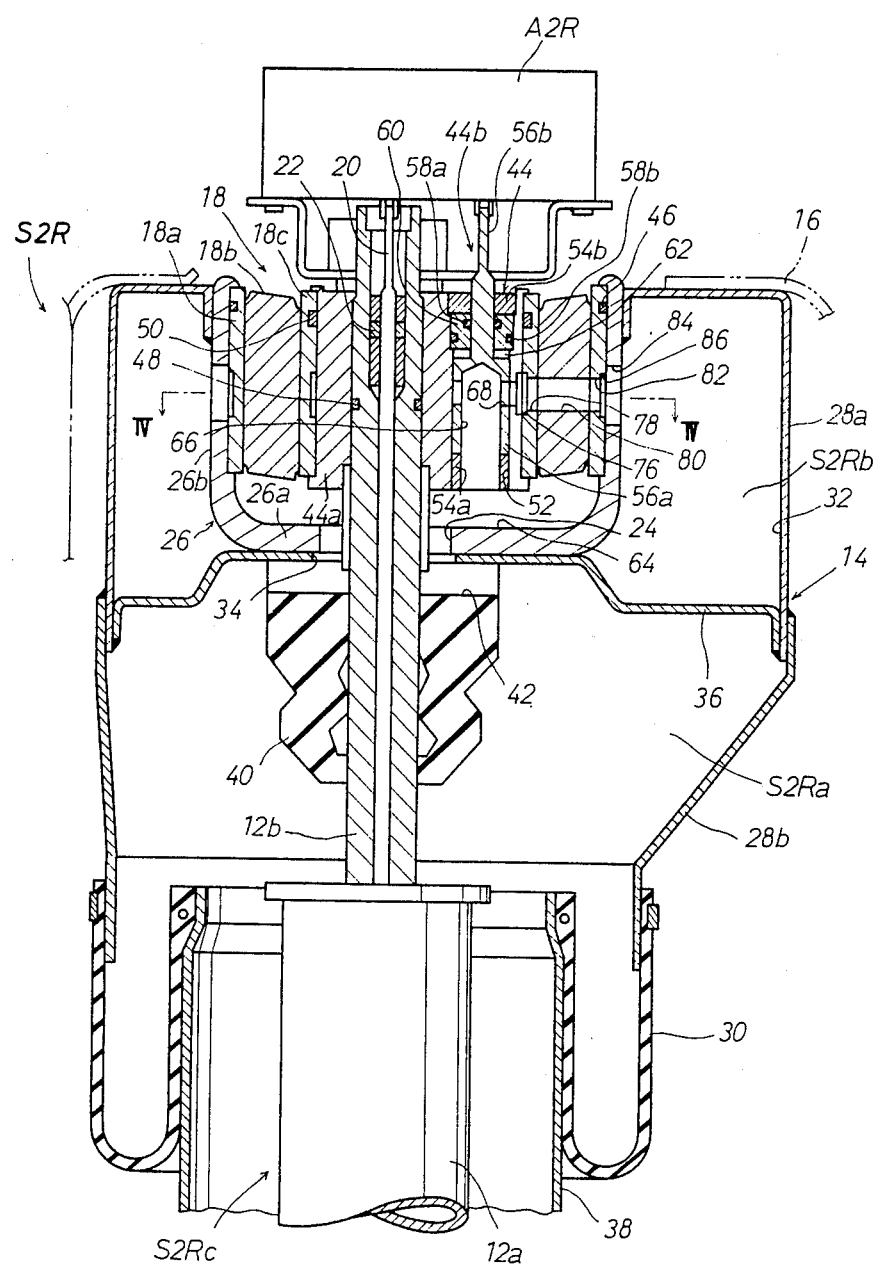
FIG. 3 is a sectional view showing main parts of the air suspension of FIG. 2.

The air suspension member S2R includes a shock absorber S2Rc having a piston and a cylinder 12a, and an air spring unit 14 provided in connection with a shock absorber S2Rc, as shown in FIG. 3.

An axle (not shown) is supported at the lower end of the cylinder 12a of the shock absorber S2Rc. An elastic cylindrical assembly 18 for elastically supporting a piston rod 12b to the vehicle body 16 is provided at the upper end of the piston rod 12b extending from the piston (not shown) slidably fitted in the cylinder 12a. The shock absorber S2Rc damping force may be controlled by operating on the valve function of the piston. A control rod 20 for controling the damping force is liquid-tightly and rotatably fitted with a sealing member 22 in the piston rod 12b.

The air spring unit 14 has a chamber 32 which is defined by a circumferential member 26, an upper housing member 28a, a lower housing member 28b, and a diaphragm 30. The circumferential member 26 includes a bottom 26a having an opening 24, in which the piston rod 12b is inserted, and a wall 26b rising from the peripheral portion of the bottom 26a. The upper housing member 28a covers the circumferential member 26 and is secured on the vehicle body. The lower housing member 28b is open at the lower end and is coupled to the lower end of the upper housing member 28a. The diaphragm 30 includes an elastic material which closes the lower end of the lower housing member 28b. The chamber 32 is divided into a lower main gas chamber S2Ra and an upper auxiliary gas chamber S2Rb by a partition member 36 secured on the bottom 26a of the circumferential member 26 and having an opening 34 corresponding to the opening 24 provided in the bottom 26a. Both the chambers S2Ra and S2Rb are filled with compressed air. The partition member 36 is provided with a buffer rubber 40 which can be brought into contact with the upper end of the cylinder 12a. The buffer rubber 40 has a passage 42 for connecting the openings 24 and 34 to the main gas chamber S2Ra. The elastic cylindrical assembly 18 is disposed inside the circumferential member 26 whose wall 26b defines the inside circumferential surface of the auxiliary gas chamber S2Rb, in such a manner that the assembly 18 surrounds the piston rod 12b.

The cylindrical elastic assembly 18 is provided with a valve unit 44 for controlling the connection of both the gas chambers S2Ra and S2Rb. The assembly 18 includes an outer cylinder 18a, a cylindrical elastic member 18b and an inner cylinder 18c which are disposed concentrically to each other. The cylindrical elastic member 18b is secured to both the cylinders 18a and 18c. The outer cylinder 18a is pressfitted on the wall 26b of the circumferential member 26 secured on the vehicle body by means of the upper housing member 28a. A valve casing 44a of the valve unit 44, in which the piston rod 12b is inserted, is secured on the inner cylinder 18c. Since the piston rod 12b is secured on the valve casing 44a, the piston rod is elastically connected to the vehicle body by means of the cylindrical elastic assembly 18. An annular air sealing member 46 is tightly packed between the outer cylinder 18a and the bottom 26b of the member 26. An annular air sealing member 48 is tightly packed between the piston rod 12b and the valve casing 44a. An annular air sealing member 50 is tightly packed between the inner cylinder 18c and the valve casing 44c.

The valve casing 44a has a hole 52 which is opened at both ends and which extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a small-diameter operating portion 56b projecting from the main portion above the elastic cylindrical assembly 18. An upper positioning ring 54b is provided at the upper end of the hole 52 and cooperates with the lower positioning ring 54a to prevent the valve 44b from dropping out of the hole 52. An annular sealing base 60, holding an inner air sealing member 58a and an outer air sealing member 58b for tightly closing the hole 52, is provided between the upper positioning ring 54b and the main portion 56a of the valve 44b. A friction reducer 62 for smoothing the revolution of the valve 44b, when the main portion 56a of the valve is pushed to the sealing base 60 by air pressure, is provided between the sealing base 66 and the main portion 56a of the valve 44b.

A chamber 64 is formed in the lower portion of the elastic cylindrical assembly 18 and is connected with the main gas chamber S2Ra by mean of the openings 24 and 34 and the passage 42 of the buffer rubber 40. The main portion 56a of the valve 44b has a recess 66 open to the chamber 64, and has a connection passage 68 extending through the main portion 56a in a diametrical direction thereof across the recess 66.

Figure 4:
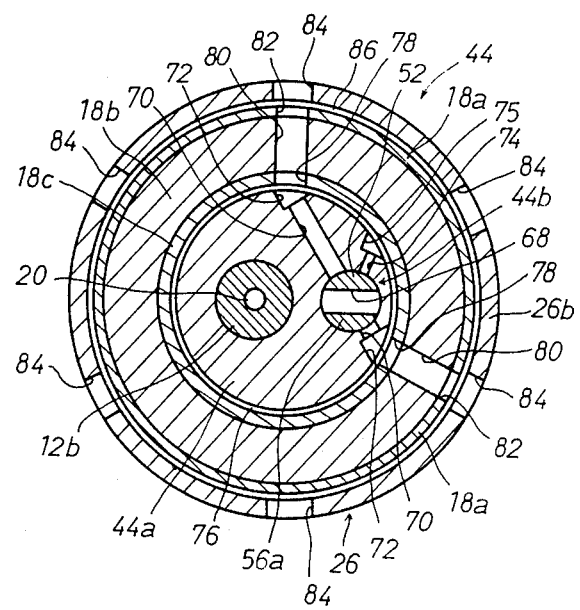
FIG. 4 is a cross sectional view of the air suspension, taken on line IV—IV of FIG. 3.

The valve casing 56b, which houses the valve 56a, has a pair of air passages 70, each of which can connect at one end with the connection passage 68, as shown in FIG. 4. The air passages 70 extend outwards in a diametrical direction of the hole 52 toward the peripheral surface of the valve 44b. The other end of each air passage 70 is open to the peripheral surface of the valve casing 44a through a face hole 72. An air passage 74, which can connect at one end with the connection passage 68, extends along the substantially same plane as the pair of air passages 70 toward the peripheral surface of the valve casing 44a, between the air passages 70. The diameter of the air passage 74 is smaller than that of each of the air passages 70. The other end of the air passage 74 is open to the peripheral surface of the valve casing 44a through a face hole 75. The inside circumferential surface of the inner cylinder 18c, covering the peripheral surface of the valve casing 44a, has an annular recess 76 which surrounds the peripheral surface of the valve casing 44a in order to connect the face holes 72 and 75 of the air passages 70 and 74 to each other.

The inner cylinder 18c has openings 78 which are open to the recess 76 which constitutes an annular air passage. The cylindrical elastic member 18b has through holes 80, which extend outwards in the radial direction of the member 18b corresponding to the openings 78. The through holes 80 are open to the peripheral surface of the outer cylinder 18a through openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a is provided with a plurality of openings 84, which are located at equal intervals in the circumferential direction of the member 26 and which are open to the auxiliary gas chamber S2Rb so as to connect the openings 78 and 82 and the through holes 80 with the auxiliary gas chamber S2Rb. the peripheral surface of the outer cylinder 18a is provided with an annular recess 86, which surrounds the outer cylinder so as to connect the openings 84, 78 and 82 and the through holes 80 to each other. The openings 84 are open to the recess 86 constituting an annular air passage.

In the embodiment shown in FIG. 4, the positions of the openings 78 and 82 and the through holes 80 are defined by the positions of the two air passages 70 of the valve casing 44a. The air passages 70 and 74 can optionally be provided in positions in the circumferential direction of the elastic member 18b since the annular recess 76, with which the air passages 70 and 74 are connected, is formed between the inner cylinder 18c and the valve casing 44a.

The control rod 20 of controlling the damping force of the shock absorber S2Rc, and the actuator A2R for rotating the rotary valve 44b of the valve unit 44, are provided at the upper end of the piston rod 12b, as shown FIG. 3.

Since the air suspension member S2R has the above-mentioned construction, the air suspension member operates as described hereinafter.

When the valve 44b is kept in such a closed position shown in FIG. 4 wherein the connection passage 68 of the valve disconnects from any of the air passages 70 and 74 of the valve casing 44a, the main gas chamber S2Ra and the auxiliary gas chamber S2Rb are disconnected from each other, thus the spring constant of the suspension member S2R is set at a large value.

When the actuator A2R rotates the valve 44b into such a position that the connection passage 68 of the valve connects with the large-diameter air passages 70 of the valve casing 44a, the main gas chamber S2Ra is connected with the auxiliary gas chamber S2Rb through the connection passage 68 connected with the main gas chamber, the large-diameter air passages 70 and the openings 78 and 82 and the through holes 80 of the elastic assembly 18 and the openings 84, so that the spring constant of the suspension member S2R is set at a small value.

When the valve 44b is rotated into such a position by the actuator A2R that the connection passage 68 of the valve connects with the small-diameter air passage 74 of the valve casing 44a, the main gas chamber S2Ra is connected to the auxiliary gas chamber S2Rb through the connection passage 68 connected with the main gas chamber, the small-diameter air passage 74, the annular recess 76, the openings 78 and 82 and the through holes 80 of the elastic assembly 18 and the openings 84, thus the spring constant of the suspension member S2R is set at an intermediate value because the small-diameter air passage 74 provides a higher air flow resistance than the large-diameter air passages 70.

Figure 5:
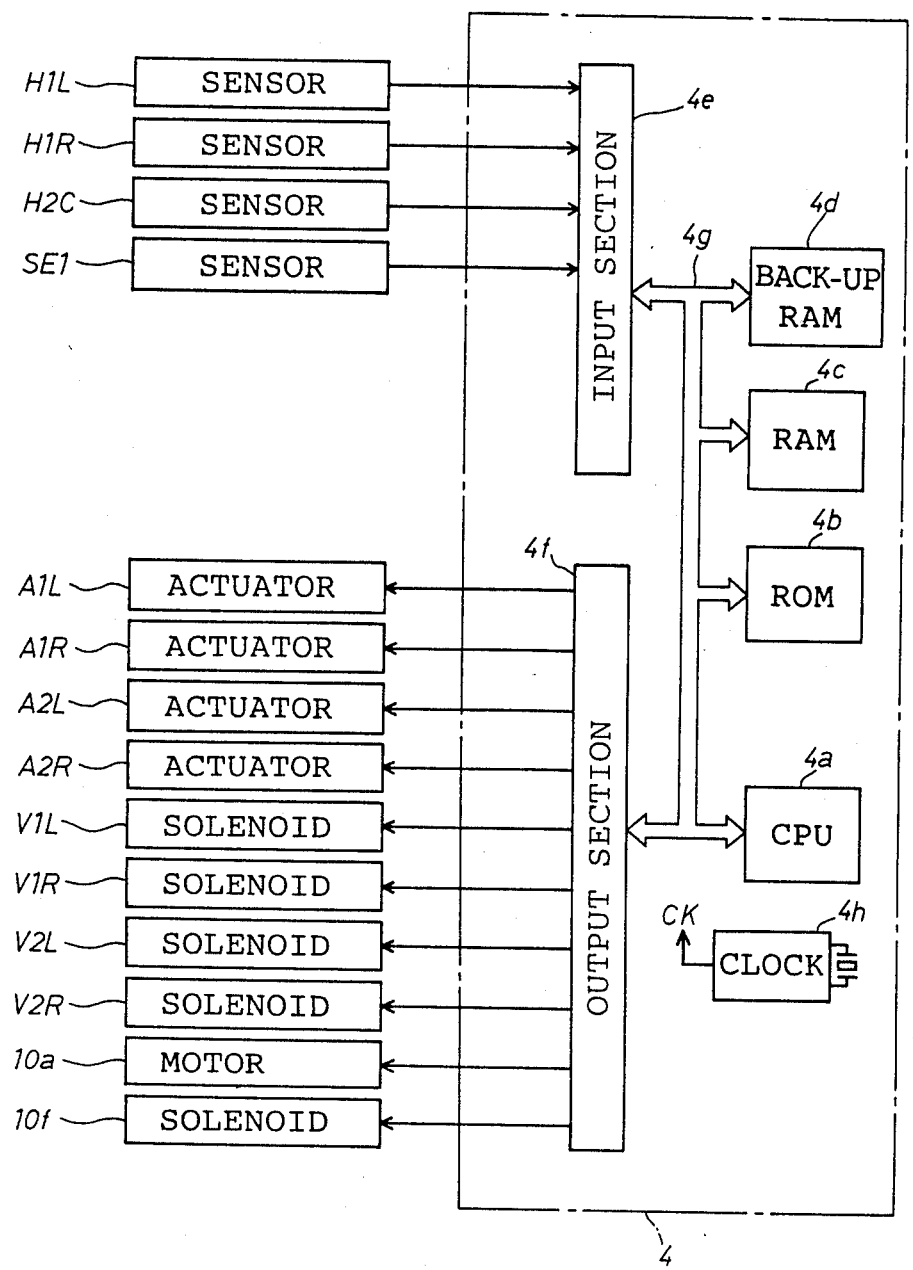
FIG. 5 is a block diagram illustrating a construction of the Electronic Control Unit (ECU)

FIG. 5 shows the construction of the ECU 4. The ECU 4 includes a Central Processing Unit (CPU) 4a, a Read Only Memory (ROM) 4b, a Random Access Memory (RAM) 4c, a back-up Random Access Memory (back-up RAM) 4d, an input section 4e, an output section 4f, a bus line 4g and a clock circuit 4h. The CPU 4a receives output data from the sensors to process them according to a control program for controlling various units, means or the like. In the ROM 4b, the control program and initial data are stored. The data, which are input to the ECU 4 for the control, are written into and read out of the RAM 4c. The backup RAM 4d is backed up by a battery so as to retain data even if the ignition key switch of the automobile is turned off. The input section 4e includes an input port (not shown), a waveshaping circuit provided if necessary, a multiplexer which selectively sends out output signals from the sensors to the CPU 4a, and an A/D converter which converts an analog signal into a digital signal. The output section 4f includes an output port (not shown), and a drive circuit for driving the actuators according to the control signal of the CPU 4a as occasion demands. The bus line 4g connects element, such as the CPU 4a, the ROM 4b, and the input and output sections 4e and 4f, with each other so as to transmit data from each element. The clock circuit 4h sends out a clock signal for providing the control timing at a predetermined time interval to the CPU 4a, the ROM 4b, the RAM 4c, etc.

Figure 6:
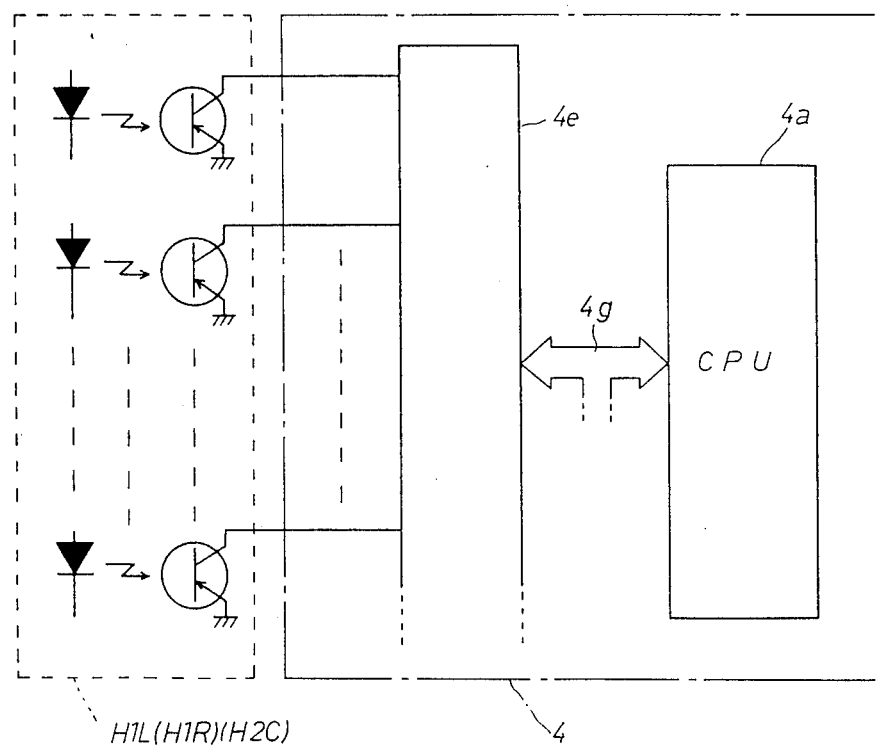
FIG. 6 is a block diagram illustrating the digital vehicle height sensor signal input circuit.
Figure 7:
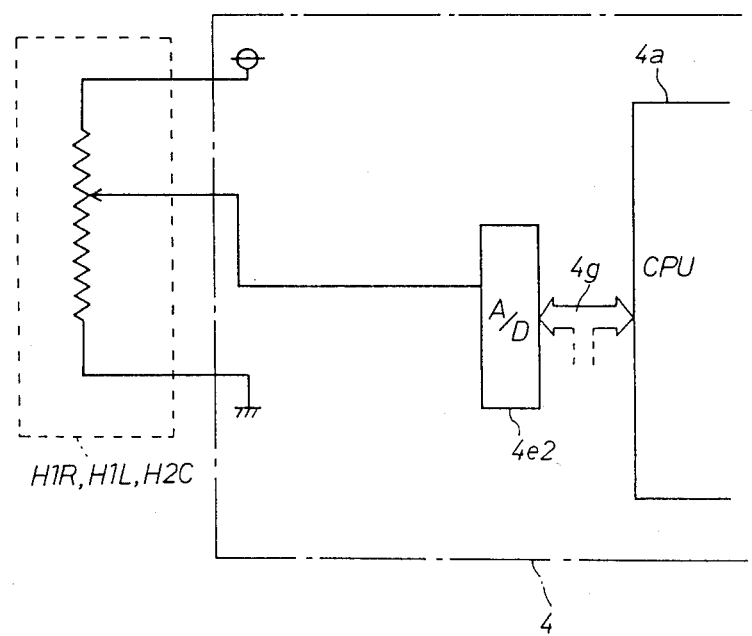
FIG. 7 is a block diagram illustrating the analog vehicle height sensor signal input circuit.

If the signals output from the vehicle height sensors H1R, H1L and H2C are 4-bit digital signals provided by a plurality of photo interrupters, they are transmitted to the CPU 4a via the input section 4e as shown in FIG. 6. On the contrary, if they are analog signals, the construction as shown in FIG. 7 is provided. In the above case, the vehicle height is input as an analog voltage signal to the ECU 4 and converted to a digital signal by an A/D converter 4e2. The converted digital signal is transmitted to the CPU 4a via the bus line 4g.

Referring to FIG. 8, the vehicle height converted value Hm in the first embodiment will be described. The left and right front vehicle height sensors H1L and H1R detect a displacement between a wheel and a vehicle body as a vehicle height. The vehicle height is denoted as one of 16 levels of 4-bit data centering on the standard position (NORMAL). When a wheel encounters a bump, i.e., in the so-called bound state including 'LOW°' or 'FULL BOUND', the vehicle height data is output at a low level (LOW). Alternatively, when the wheel encounters a dip, i.e., so-called rebound state including 'HIGH' or 'FULL REBOUND', the vehicle height data is output at a high level (HIGH). The relation between the above output values and the vehicle height converted value Hm is provided according to a table shown in FIG. 8, which is preliminarily stored at the predetermined area in the ROM 4b of the ECU 4. The ECU 4 converts the output value from the left and right front wheel vehicle height sensors H1L and H1R to the vehicle height converted value Hm based on the above table to be used for the suspension control described hereinafter. The vehicle height converted values Hm in the vicinity of 'FULL BOUND' or 'FULL REBOUND' re not provided to be equally spaced as compared to those in the middle of the table for the purpose of obviating bottoming or other shortcomings. The converted value may instead be based on a velocity or acceleration of the vehicle height.

Figure 9:
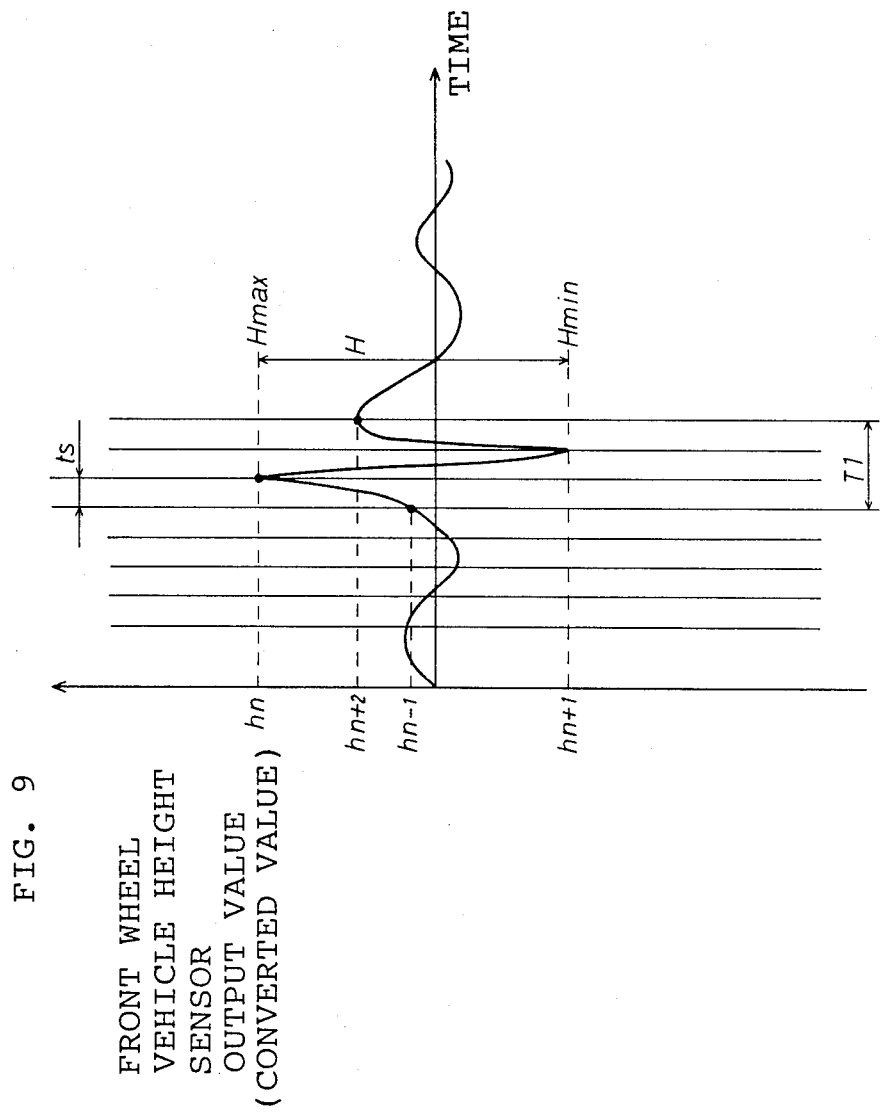
FIG. 9 illustrates the relationship among the vehicle height displacement, the detection time and the determination time.

The relation among a vehicle height displacement, a vehicle height detection time interval and a determination time interval in the first embodiment of the present invention is described with reference to FIG. 9. As shown in FIG. 9, a vehicle height detection time ts is a period for detecting outputs from left and right front wheel vehicle height sensors H1L and H1R. In the first embodiment, the vehicle height detection time interval ts equals 8 msec. The determination time T1 is a period for determining a vehicle height displacement for each detected vehicle height detection time interval ts. The determination time T1 is derived from the following equation 1;

$$T1 = (n-1) \times ts \qquad 1$$

where n stands for the frequency of which the vehicle height is detected, in the first embodiment, n equals 4. The determination time T1 is set to be less than the unsprung resonance cycle to satisfy the following equation 2;

$$T1 \leq Tr - Ta \qquad 2$$

where Tr and Ta respectively denote a time delay caused by a rear wheel to reach a front wheel position and a time for altering the suspension characteristic.

The time delay Tr is derived from the following equation 3:

$$Tr = WB/V \qquad 3$$

where WB and V respectively stand for a wheel base and a vehicle speed.

A maximum vehicle height displacement value H is derived from the following equation 4:

$$H = H_{max} - H_{min} \qquad 4$$

where $H_{max}$ and $H_{min}$ denote maximum and minimum converted values within the determination time T1, respectively.

When the maximum vehicle height displacement value H is above a basic determination value Hc, the suspension characteristic is altered from 'SPORT' state to 'SOFT' state. Then, shock absorbing control for restoring the suspension characteristic from 'SOFT' state to 'SPORT' state is executed after the elapse of a delay time Td. In the first embodiment, The basic determination value Hc equals 5 as a vehicle height converted value and the above delay time Td equals 2 sec.

Following is an explanation of the vehicle speed V and the suspension characteristic under the above shock absorbing control and the vehicle speed sensing control is described with reference to FIG. 10.

Figure 10:
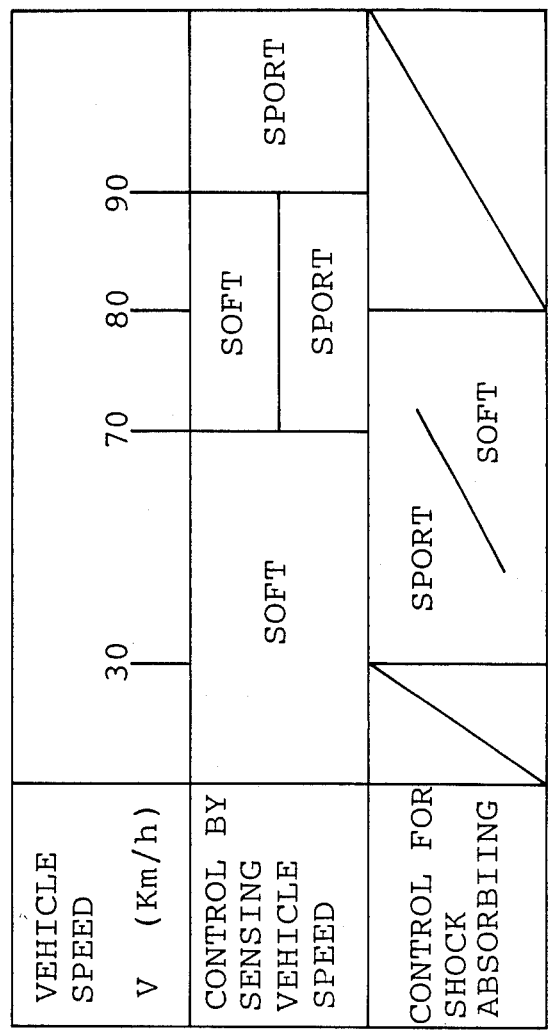
FIG. 10 illustrates the relationship among the vehicle speed sensing control, the shock absorbing control and the suspension characteristic.

As shown in FIG. 10 under the vehicle speed sensing control, if the vehicle speed V is less than 70 km/h, the suspension characteristic is altered to 'SOFT' state. If the vehicle speed is accelerated to be less than 90 km/h, the suspension characteristic is maintained the 'SOFT' state. If the vehicle speed is further accelerated to exceed 90 km/h, the suspension characteristic is altered to the 'SPORT' state. In case the vehicle speed which is not less than 70 km/h and less than 90 km/h is in deceleration, the suspension characteristic is maintained the 'SPORT' state. The vehicle speed sensing control is started when the vehicle speed V in acceleration exceeds the first vehicle speed, i.e., 90 km/h, and terminated when the vehicle speed V in deceleration is less than the second vehicle speed, i.e., 70 km/h. Alternatively, a preferential shock absorbing control is executed only when the vehicle speed V is within the range from 30 km/h to 80 km/h, whereby an overlapped region of the vehicle speed V ranging from 70 km/h to 80 km/h is derived, concerning both the vehicle speed sensing control and the shock absorbing control.

Figure 11A:
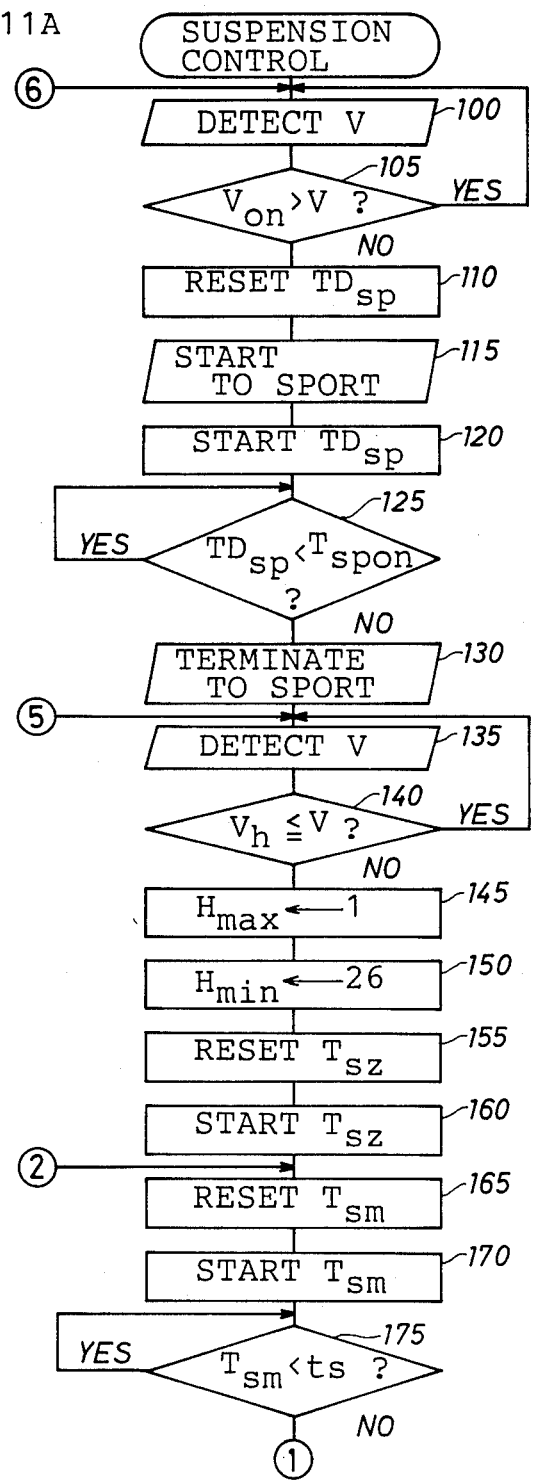
FIGS. 11A thru 11C are flow charts showing the process steps executed by the ECU.
Figure 11B:
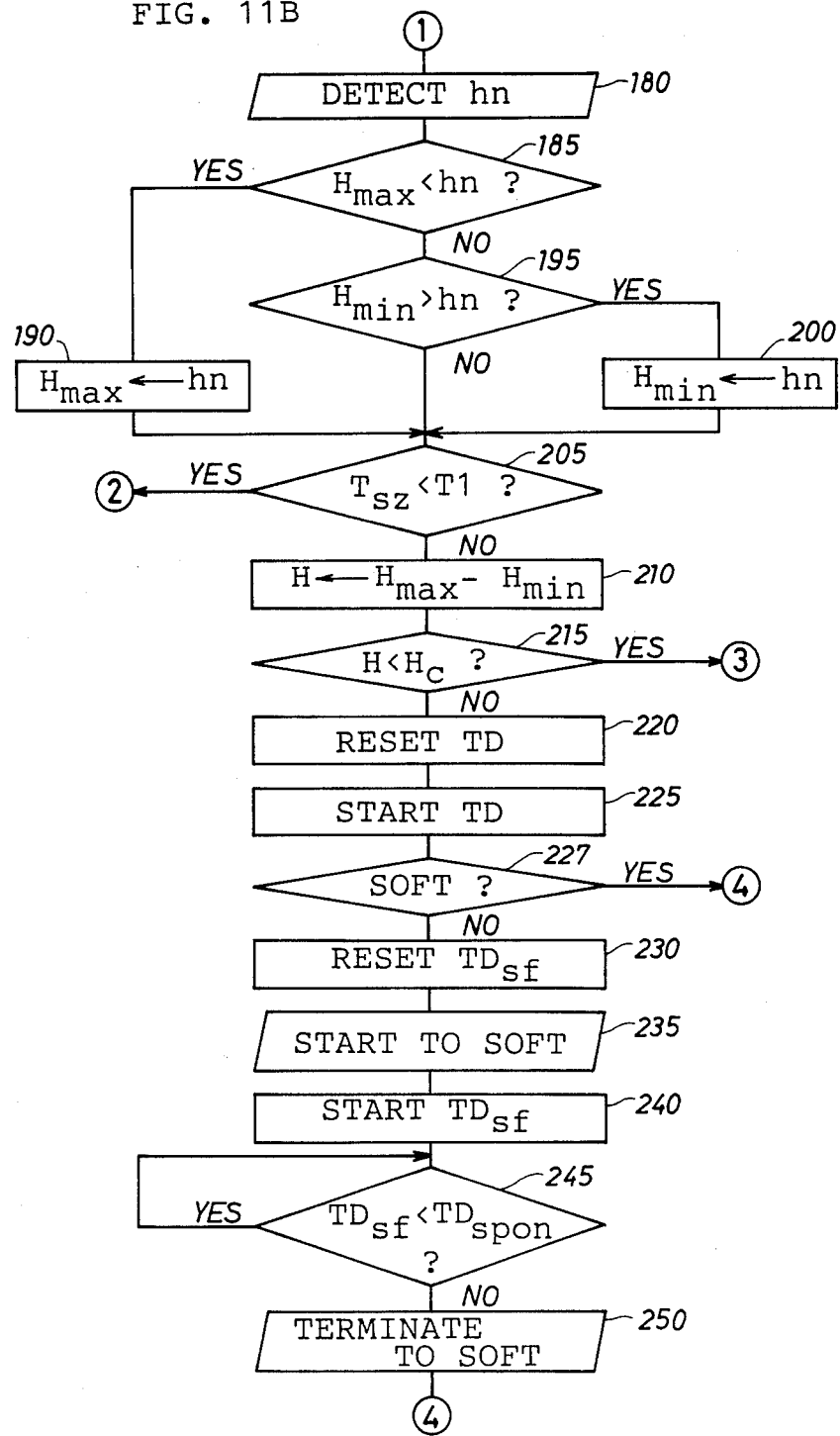
Figure 11C:
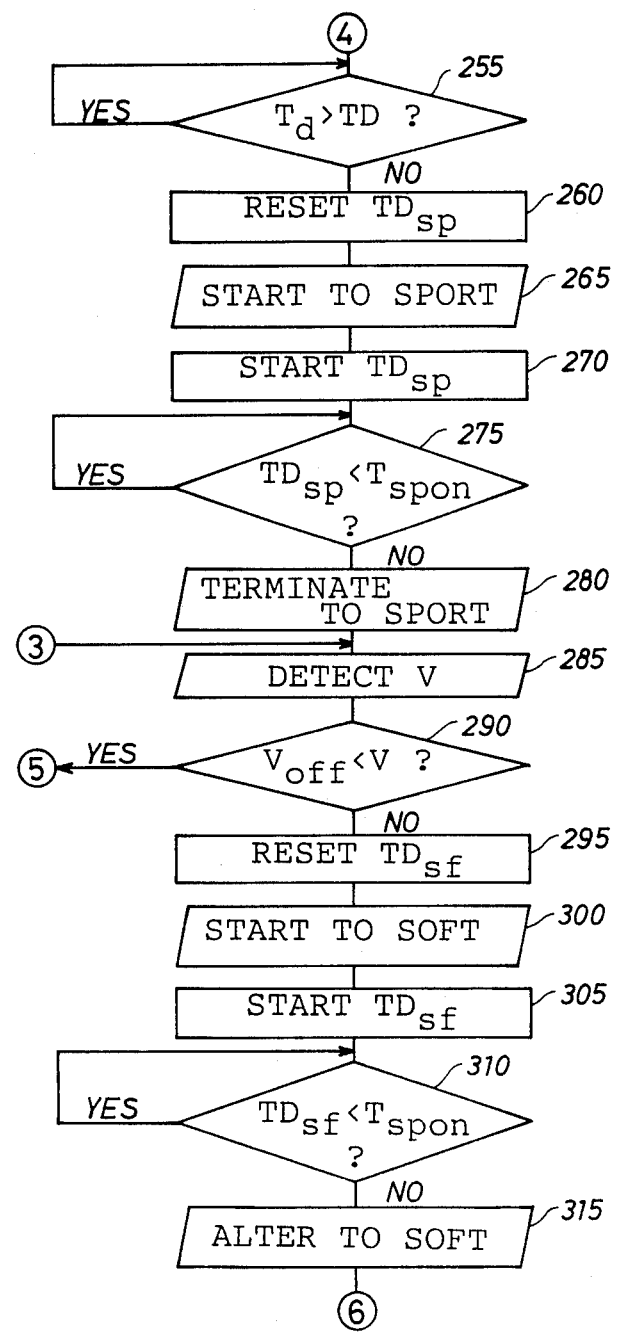

The process steps for the suspension control executed by the ECU 4 in the first embodiment of the invention is described with reference to flow charts as shown in FIG. 11A through 11C. The process steps for the suspension control is repeatedly executed at a predetermined time interval in case 'Auto Mode' is selected by a driver after the vehicle is started. A brief description of the process steps are hereinafter described.

(1) When the vehicle speed exceeds the first vehicle speed $V_{on}$ (e.g., 90 km/h), the suspension characteristic is altered to the 'SPORT' state at steps 100, 105, 110, 115, 120, 125 and 130.

(2) When the vehicle speed is less than a preferential shock absorbing control upper limit value $V_h$ (e.g., 80 km/h), the preferential shock absorbing control is executed. When the maximum vehicle height displacement value H within the determination time T1, which is determined every vehicle height detection time intervals ts, exceeds the basic determination value Hc, the suspension characteristic is altered to the 'SOFT' state. The suspension characteristic is restored to the 'SPORT' state after the elapse of the delay time Td at steps 135, 140, 145, 150, 155, 160, 165, 170, 175, 180, 185, 190, 195, 200, 205, 210, 215, 220, 225, 227, 230, 235, 240, 245, 250, 255, 260, 265, 270, 275 and 280.

(3) When the vehicle speed V is less than the second vehicle speed $V_{off}$ (e.g., 70 km/h), the suspension characteristic is altered to the 'SOFT' state at steps 285, 290, 295, 300, 305, 310 and 315.

Detailed description of these process steps will now be explained. At step 100, a vehicle height sensor SE 1 detects a vehicle speed V. A determination is made whether the vehicle speed V is below the first vehicle speed $V_{on}$ at step 105. In the first embodiment, the first vehicle speed $V_{on}$ equals 90 km/h. If the determination is YES, the program returns to the step 100. If the determination is NO, the program proceeds to step 110 where the suspension characteristic is altered to the 'SPORT' state in response to the vehicle speed sensing control as shown in the table of FIG. 10, i.e., an alteration timer $TD_{sp}$ for altering the suspension characteristic to the 'SPORT' state is reset at the step 110. The program then proceeds to step 115 where the suspension characteristic is altered to the 'SPORT' state by increasing a spring constant and damping force of the air suspension members S1L, S1R, S2L and S2R. A rotary valve 44b and a control rod 20 are driven for rotation by suspension characteristic alteration actuators A1L, A1R, A2L and A2R. The program then proceeds to step 120 where an alteration timer $TD_{sp}$ starts time counting. At step 125, it is determined whether the counted value by the alteration time $TD_{sp}$ is below an alteration time $T_{spon}$ necessary for altering the suspension characteristic to the 'SPORT' state. If the determination is YES, the step is repeatedly executed to delay for the alteration time $T_{spon}$. If the determination is NO, the program proceeds to step 130 where the alteration of the suspension characteristic to the 'SPORT' state is terminated, thereby stopping a driving operation of the suspension characteristic alteration actuators A1L, A1R, A2L and A2R with the suspension fully altered to the sport state.

The program then proceeds to step 135 where the vehicle speed V is detected by the vehicle speed sensor SE1. At the following step 140, it is determined whether the detected vehicle speed at the step 135 is not less than the shock absorbing control upper limit $V_h$. In the first embodiment, the shock absorbing control upper limit $V_h$ equals 80 Km/h. If the determination is YES, the program returns to the step 135. If the determination is NO, the program proceeds to step 145 where the shock absorbing control is started.

At the step 145, the initiallization of the maximum vehicle height displacement H is executed by substituting the minimum value of the converted value Hm, i.e., '1' for the maximum vehicle height $H_{max}$. The program proceeds to the following step 150 where the initialization is executed by substituting the maximum value of the vehicle height converted value Hm, i.e., '26', for the minimum vehicle height $H_{min}$. The program proceeds to step 155 where a determination timer $T_{sz}$ for counting the determination time T1 is reset, and proceeds to step 160 where the determination timer $T_{sz}$ starts time counting. At step 165, a detection timer $T_{sm}$ for counting the vehicle height detection time interval ts is reset, and at step 170, the detection timer $T_m$ starts time counting. The program then proceeds to step 175 where it is determined whether the value of the detection timer $T_{sm}$ is below the vehicle height detection time interval ts, i.e., 8 msec. If the determination is YES, the program repeatedly executes the same process step, waiting for the termination of the detection timer $T_{sm}$ count. If the determination is NO, the program proceeds to step 180 where the output value from the front wheel vehicle height sensors H1L and H1R is detected to be converted to the converted value hn. The output value from the front wheel vehicle height sensors H1L and H1R may be derived either from that of H1L or H1R. The mean value of the output from the sensors of H1L and H1R, or the greater value of either of the sensors H1L and H1R may be available as the output value of the front wheel article height sensors. The process step then proceeds to step 185 where it is determined whether the detected converted value hn at step 180 exceeds the maximum vehicle height $H_{max}$. If the determination is YES, the program proceeds to step 190 where the converted value is updated to become the maximum vehicle height $H_{max}$, then proceeds to step 205. While, if the determination at the step 185 is NO, the program instead proceeds to step 195 where it is determined whether the converted value hn is below the minimum vehicle height $H_{min}$. If the determination is YES, the program proceeds to step 200 where the converted value hn is updated to become the minimum vehicle height $H_{min}$, then proceeds to the step 205. At the step 205, it is determined whether the counted value of the determination timer $T_{sz}$ is below the determination time T1. In the first embodiment, the determination time T1 equals 24 msec. If the determination is NO, the program returns to the step 165 where the vehicle height is detected again. If the determination is YES, the program proceeds to step 210 where the maximum vehicle height displacement value H is obtained by subtracting the minimum vehicle height $H_{min}$ from the maximum vehicle height $H_{max}$.

The program then proceeds to step 215 where it is determined whether the maximum vehicle height displacement value H is below the basic determination value Hc. If the determination is YES, program proceeds to step 285 which is described hereinafter. If the determination is NO, the program proceeds to step 220 where a delay timer TD for counting a delay time is reset. At the following step 225, the delay timer TD starts time counting. The program proceeds to step 227 where it is determined whether the suspension characteristic is in the 'SOFT' state. If the determination is YES, the program proceeds to step 255 which is described hereinafter. If the determination is NO, the program proceeds to step 230. At further steps beginning with the step 230, the suspension characteristic is altered in accordance with the table for shock absorbing control as shown in FIG. 10, i.e., from sport to soft if the vehicle speed is between 70 and 80 km/h. At the process steps of 230, 235, 240, 245 and 250, the suspension characteristic alteration actuators A1L, A1R, A2R and A2L rotate the rotary valve 44 and the control rod 20 to decrease the spring constant and damping force of the air suspension members S1L, S1R, S2R and S2L.

The program then proceeds to step 255 where it is determined whether the value of the delay timer TD is less than the delay time $T_d$, i.e., 2 sec. If the determination is YES, the program repeatedly executes the process step, waiting for the elapse of the delay time $T_d$. If the determination is NO, the program proceeds to step 260 and the following steps where the suspension characteristic is altered to the 'SPORT' state. At the process steps 60, 265, 270, 275 and 280, the suspension characteristic alteration actuators A1L, A1R, A2L and A2R rotate the rotary valve 44b and the control rod 20 to increase the spring constant and damping forces of the air suspension members S1L, S1R, S2L and S2R.

The program proceeds to step 285 where the vehicle speed V is detected again by the vehicle speed sensor SE1. At the following step 290, a determination is made as to whether the detected vehicle speed exceeds the second vehicle speed $V_{off}$, i.e., 70 km/h. If the determination is YES, the program returns to the step 135 where the shock absorbing control is started again. If the determination is NO, the program proceeds to step 295 and to the following steps where the suspension characteristic is altered to the 'SOFT' state according to the table for the vehicle speed sensing control as shown in the table of FIG. 10. At the process steps 295, 300, 305, 310 and 315, the suspension characteristic alteration actuators A1L, A1R, A2L and A2R rotate the rotary valve 44b and the control rod 20 to decrease the spring constant and damping force of the air suspension members S1L, S1R, S2L and S2R. After the above process steps are terminated, the program returns to the step 100. The suspension control described in the invention is thus executed at predetermined time intervals in response to the running condition of the vehicle.

Figure 12:
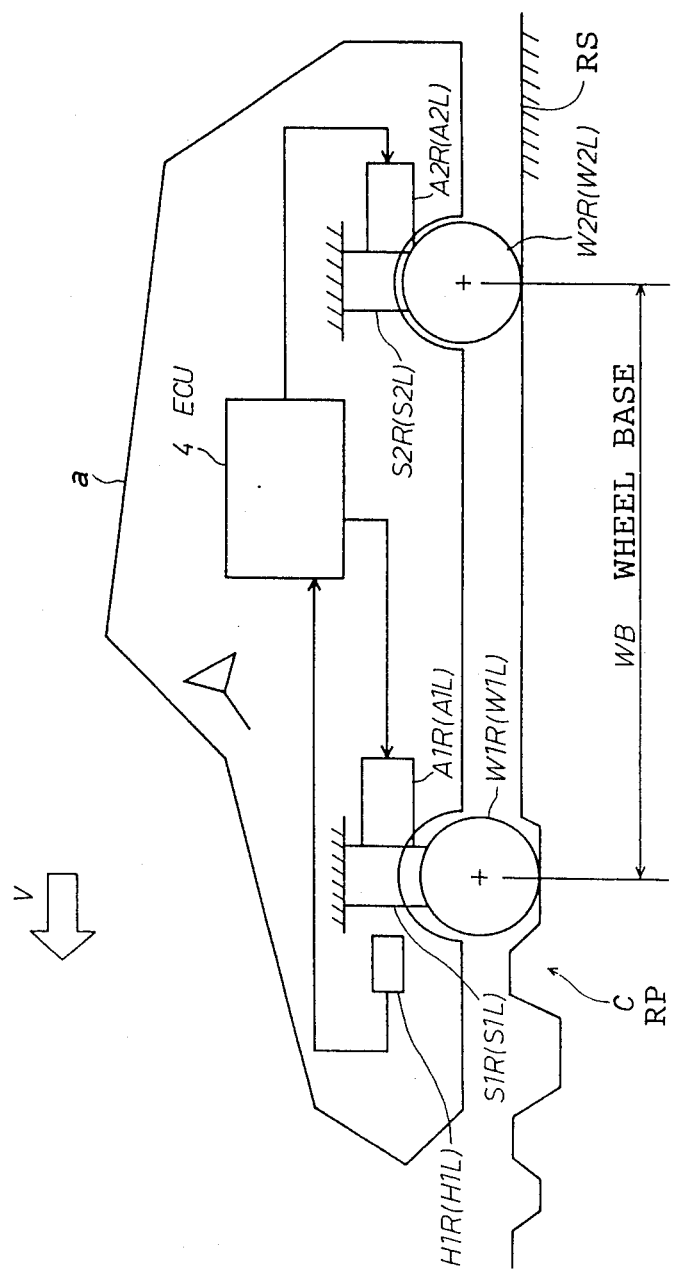
FIG. 12 is a schematic view illustrating that an automobile with the suspension controller of the first embodiment moves on a road surface having dips and bumps.

An example of the above suspension control is described with reference to FIG. 12 and FIGS. 13A–13D. FIG. 12 illustrates a vehicle AM, having the suspension controller described in the first embodiment of the present invention, is about to pass over a rough part RS in the road surface while it is running on the flat road surface RP. FIG. 13A through 13D are timing charts indicating the changes in output value from the front wheel vehicle height sensors H1L and H1R, an applied current for the suspension characteristic alteration actuator, the suspension characteristic, and the vehicle speed V, respectively.

When the vehicle AM running on the flat road surface RP starts to be accelerated, the vehicle speed V exceeds the first vehicle speed $V_{on}$ of 90 km/h at a time point t1 whereby the vehicle speed sensing control is started. At the time point t1, the suspension characteristic alteration actuators A1L, A1R, A2L and A2R and energized so that the suspension characteristic is altered from the 'SOFT' state to 'SPORT' state at a time point t2, which is after the elapse of the alteration time $T_a$ for altering the suspension characteristic. The energization to the respective actuator is continued until a time point t3 for a total time elapse of $T_b$.

The vehicle AM is decelerated to be below the shock absorbing control upper limit value $V_h$, i.e., 80 km/h at a time point t4, thereby starting the preferential shock absorbing control. At a time point t5, either front wheel W1R or W1L starts to pass over the rough part RS as shown in FIG. 12. Then, the maximum vehicle height displacement value H which is detected by the front wheel vehicle height sensor H1R or H1L from the time point t5 to a time point t6, which is after the elapse of the determination time T1 is found to be not less than the basic determination value Hc, i.e., 5. At the time point t6, The suspension characteristic alteration actuators A1L, A1R, A2L and A2R are energized so that the suspension characteristic is altered from the 'SPORT' state to 'SOFT' state at a time point t7, i.e., after the alteration time $T_a$ for altering the suspension characteristic of elapsing. The energization to the respective actuators is continued until a time point t8, which is after the elapse of the energization time for the actuator. Meanwhile, at the time point t6, the delay time $T_d$, i.e., 2 sec. is started to be counted. The rear wheels W2R and W2L also pass over the rough part RS within a time range from the time point t6 to a time point t9, which follows the elapse of after the delay time $T_d$. At the time point t9, the suspension characteristic alteration actuators A1L, A1R, A2L and A2R are energized so that the suspension characteristic is altered from the 'SOFT' state to 'SPORT' state at a time point t10 after the elapse of the alteration time $T_a$. The energization to the respective actuator is continued until a time point t11 after the elapse of the energization time $T_b$.

With the vehicle AM running again on the flat road surface RP, decreasing its speed to be below the second vehicle speed $V_{off}$, i.e., 70 km/h at a time point t12, thereby starts the vehicle speed sensing control. At the time point t12, the suspension characteristic alteration actuators A1L, A1R, A2L and A2R are energized so that the suspension characteristic is altered from the 'SPORT' state to 'SOFT' state at a time point t13 after the elapse of the alteration time $T_a$. The energization to the respective actuators is continued until a time point t14 after the elapse of the energization time $T_b$. As above described, the suspension characteristic is positively altered in response to the vehicle speed and the road surface condition.

In the first embodiment, the front wheel vehicle height sensors H1L and H1R, the ECU4 and executed process step thereof, i.e., the step 180, may function as the vehicle height detection means M1. The vehicle speed sensor SE1, the ECU4 and executed process steps thereof, i.e., the steps 100, 135 and 285, may function as the vehicle speed detection means M2. The air suspension members S1L, S1R, S2L and S2R and the suspension characteristic alteration actuators A1L, A1R, A2L and A2R may function as the suspension characteristic alteration means M3. The ECU4 and the executed process steps thereof, i.e., the steps 140, 145, 150, 155, 160, 165, 170, 175, 180, 185, 190, 195, 200, 205, 210, 215, 220, 225, 227, 230, 235, 240, 245 and 250, function as the vehicle height determination means M4. The ECU 4 and the executed process steps thereof, i.e., the steps of 105, 110, 115, 120, 125, 130, 290, 295, 300, 305, 310 and 315, function as the vehicle speed determination means M5. The ECU 4 and the executed process step thereof, i.e., the step 140, function as the preference means M6.

As above described, when the vehicle speed V detected by the vehicle speed sensor SE1 exceeds the first vehicle speed $V_{on}$, the suspension characteristic is altered to the 'SPORT' state by the vehicle speed sensing control. Then, if the vehicle speed V is decreased to be within the range from the second vehicle speed $V_{off}$ to the shock absorbing control upper limit speed value $V_h$, the shock absorbing control is preferentially executed. According to this preferential shock absorbing control, if the maximum vehicle height displacement value H detected by the front wheel vehicle height sensors H1L and H1R within the determination time T1 exceeds the basic displacement value Hc, the suspension controller in the first embodiment is so constructed that the suspension characteristic is altered to the 'SOFT' state. Therefore, even when the vehicle speed V exceeds the second vehicle speed $V_{off}$, so long as it it is below the shock absorbing control upper limit speed $V_h$, the shock absorbing control is preferentially executed, instead of the vehicle speed sensing control, whereby the shock being exerted by the vehicle caused by passing over a single bump and dip is absorbed to improve the ride comfort.

Even when the suspension characteristic is altered to the 'SOFT' state by the shock absorbing control, it is altered to the 'SPORT' state again after the elapse of the delay time $T_d$, thereby maintaining the drivability and stability of the running vehicle when passing over numerous closely spaced bumps and dips.

Even when the suspension characteristic is altered to 'SOFT' state, the advantage of preventing the hunting in the vehicle speed sensing control is not impaired because the suspension characteristic is altered to 'SPORT' state again after the elapse of the delay time $T_d$.

If the vehicle height displacement is detected to be not less than the basic determination value Hc before the elapse of the delay time $T_d$ under the shock absorbing control, the delay time $T_d$ is extended for the purpose of reducing the frequency for altering the suspension characteristic to be as low as possible. Accordingly the reliability and durability of the suspension characteristic alteration actuators A1L, A1R, A2L and A2R and the air suspension members S1L, S1R, S2L and S2R are improved.

In the first embodiment, the suspension characteristic is altered with two steps of 'SOFT' and 'SPORT', however, the embodiment might be constructed to alter the suspension characteristic with three steps of 'SOFT', 'SPORT' and 'HARD', or with more steps. In case of adapting the above construction, more accurate suspension control can be obtained in response to the road surface condition and the vehicle speed V.

Examples of other suspension characteristic alteration means apart from any air suspensions are described below.

Figure 14A:
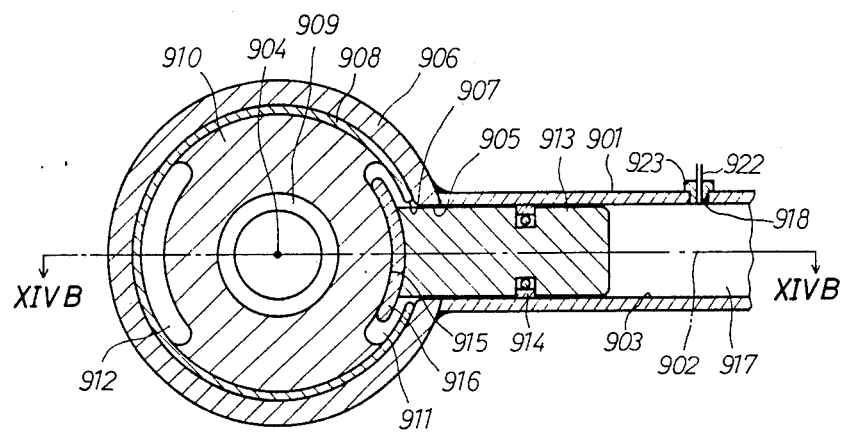
FIG. 14A is a vertical sectional view of the first embodiment.
Figure 14B:
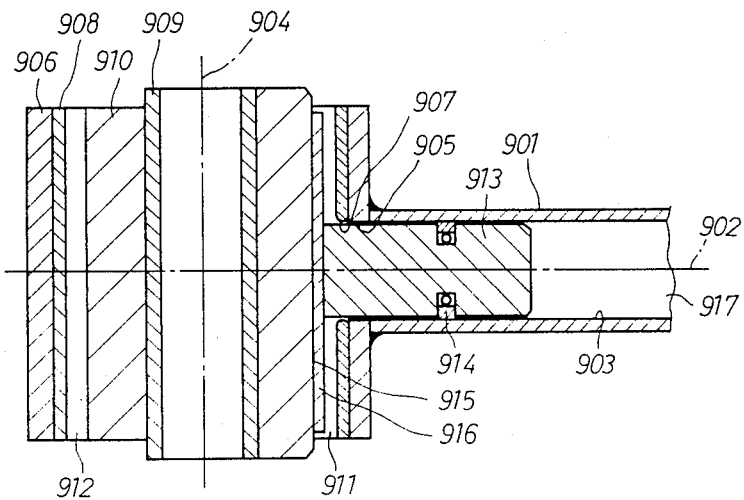
FIG. 14B is a sectional view on line XIVB—XIVB of FIG. 14A.

The first embodiment is a bush for joining suspension bars such as the upper and lower control arms of a suspension, as shown in FIGS. 14A and 14B. The stiffness of the bush can be changed so as to alter the characteristic of the suspension. The spring constant and damping force of the bush are varied by changing the bush stiffness.

FIG. 14A shows a longitudinal sectional view of the joint of the suspension bar. FIG. 14B shows a sectional view taken on line XIVB—XIVB of FIG. 14A. In the drawings, numeral 901 designates a control arm extending along an axis 902 and having a hole 903. A sleeve 906, which extends along an axis 904 perpendicular to the axis 902 and which has a hole 905, is welded around the hole 905 at one end of the control arm 901. An outer cylinder 908 having a hole 907 is press-fitted in the sleeve 906. An inner cylinder 909 is provided in the outer cylinder 908 concentrically thereto. A bush 910 made of vibration-proof rubber is interposed between the outer cylinder 908 and the inner cylinder 909. The bush 910 and the outer cylinder 908 define arc-shaped openings 911 and 912 which are located opposite to each other along the axis 904, thus the stiffness in the direction of the axis 902 is set at a relatively low value. The hole 903 of the control arm 901 constitutes a cylinder which supports a piston 913 for movement back and forth along the axis 902. A sealing member 914 is tightly packed in between the piston 913 and the inside surface of the hole 903. A contact plate 916 is secured at one end of the piston 913. The contact plate 916 curves about and extends along the axis 904, thus being brought into contact with the inside surface 915 of the opening 911.

The other end of the control arm 901 is constructed the same as shown in FIGS. 14A and 14B. A cylinder chamber 917 is defined between the piston 913 and another piston (not shown), and is fitted with the other end of the control arm 901. The cylinder chamber 917 is connected with the exterior through a tapped hole 918 provided in the control arm 901. A nipple 923, fixed on one end 922 of a conduit connected to an oil pressure source not shown in the drawings, is secured in the tapped hole 918 to apply oil pressure to the cylinder chamber 917.

When the oil pressure in the cylinder chamber 917 is relatively low, the force pushing the piston 913 (leftward in the drawings) is so weak that the piston is held in such a position (shown in the drawings) that the contact plate 916 is brought into light contact with the inner surface 915 of the bush 910. As a result, the stiffness of the bush 910 in the direction of the axis 902 is made relatively low. When the oil pressure in the cylinder chamber 917 is relatively high, the piston 913 is driven (leftward in the drawings) and the contact plate 916 pushes the inner surface 915 of the bush 910 so that the portion of the bush between the contact plate and the inner cylinder 909 is compressed. As a result, the stiffness of the bush 910 in the direction of the axis 902 is raised.

If the suspension bar is provided between the body and the rear wheel of a vehicle, the characteristic of the suspension for the rear wheel can be altered by controlling the oil pressure in the cylinder chamber 917 through the action of an actuator such as a pressure control valve. When the oil pressure is raised by an instruction from the ECU 4, the stiffness of the bush 910 is enhanced to increase the damping force and spring constant of the suspension. Thus, the suspension characteristic is altered to 'HARD' state for improving the control and stability of the vehicle. When the oil pressure is lowered, the damping for the rear part of the vehicle is reduced.

Figure 15A:
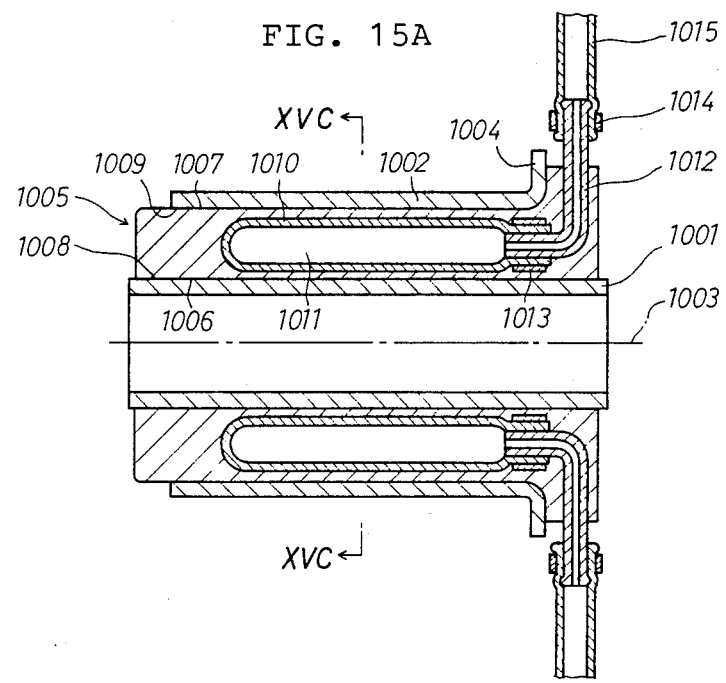
FIG. 15A is a sectional view of a second embodiment.
Figure 15B:
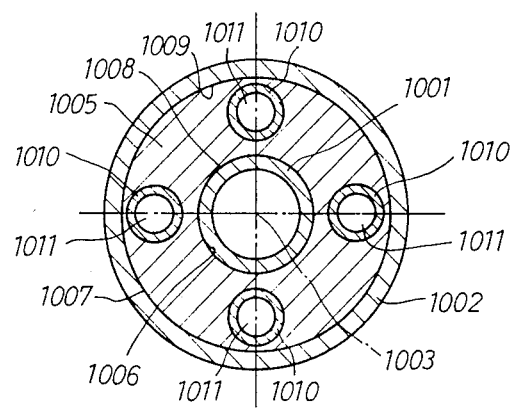
FIG. 15B is a sectional view taken on line XVC—XVC of FIG. 15A.

The second embodiment is another bush which is shown in FIGS. 15A and 15B and which has the same function as the former.

FIG. 15A shows a longitudinal sectional view of the bush integrally constructed with inner and outer cylinders as a bush assembly. FIG. 15B shows a sectional view taken on line XVC—XVC of FIG. 15A. In the drawings, four expansible and compressible hollow bags 1010, which extend along an axis 1003 and which are separately located in equiangular positions around the axis, are embedded in a bush 1005. The hollow bags 1010 define four chambers 1011 extending along the axis 1003 and being separately located in equiangular positions around the axis. Each hollow bag 1010 is secured at one end on one end of a coupler 1012, embedded in the bush 1005 by a clamp 1013 so as to connect the chambers 1011 with the exterior by means of the coupler 1012. One end of a hose 1015 is fixedly connected to the other end of the coupler 1012 by a clamp 1014, and the other end of the hose 1015 is connected to a compressed air source by means of an actuator such as a pressure control valve (not shown). Thus, the controlled air pressure can be introduced into each chamber 1011. When the actuator is put in operation by the ECU 4, the air pressure in each chamber 1011 can be varied to change the stiffness of the bush in a stepless manner. The stiffness of the bush can thus be appropriately changed to be high (HARD) or low (SOFT) after a shock to the front wheels is detected.

FIGS. 16A–16G show a construction of a stabilizer a the third embodiment.

Figure 16A:
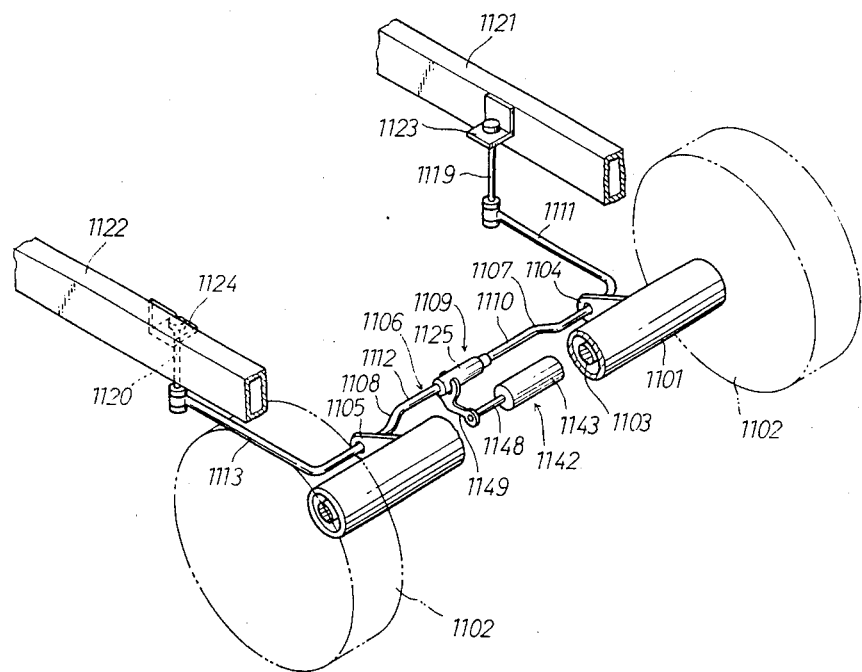
FIG. 16A is a perspective view of a third embodiment in use.
Figure 16B:
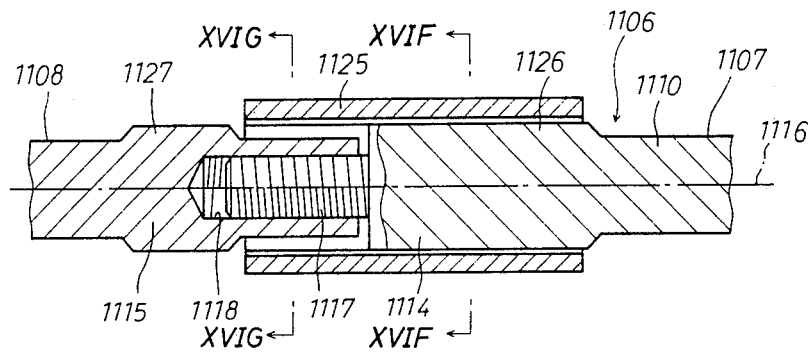
FIGS. 16B and 16C are enlarged sectional views each showing a part of the third embodiment of FIG. 16A.
Figure 16C:
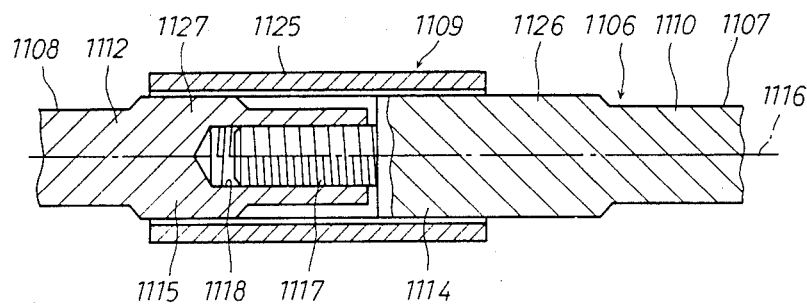
Figure 16D:
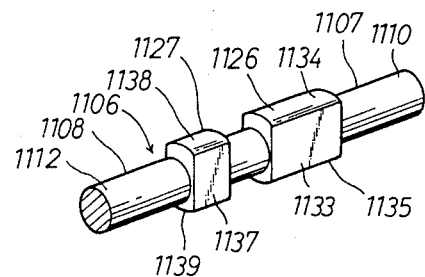
FIG. 16D is a perspective view of the main part of the third embodiment of FIG. 16A.
Figure 16E:
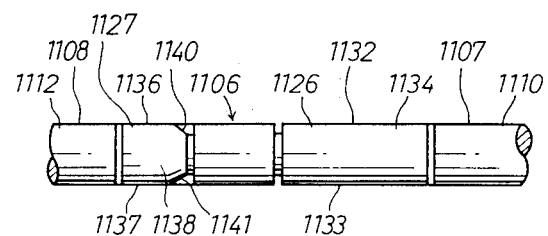
FIG. 16E is a plan viwe of FIG. 16D.
Figure 16F:
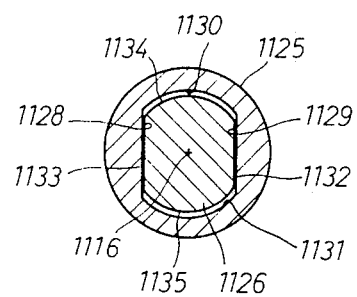
FIG. 16F is a sectional view taken on line XVIF—XVIF of FIG. 16B.
Figure 16G:
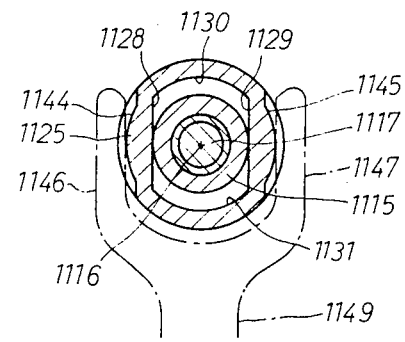
FIG. 16G is a sectional view taken on line XVIG—XVIG of FIG. 16B.

FIG. 16A shows an exploded perspective view of a torsion-bar-type stabilizer built in an axle-type rear suspension of an automobile. FIGS. 16B and 16C respectively show enlarged partial longitudinal sectional views of a main part of the stabilizer of FIG. 16A in the coupled and uncoupled states. FIG. 16D shows a perspective view of the main part shown in FIGS. 16B and 16C, omitting the clutch. FIG. 16E shows a plan view of the main part shown in FIG. 16D. FIG. 16F shows a cross-sectional view taken on line XVIF—XVIF of FIG. 16B. FIG. 16G shows a cross-sectional view taken on line XVIG—XVIG of FIG. 16B.

In the drawings, an axle 1103 coupled with wheels 1102 is rotatably supported by an axle housing 1101. A pair of brackets 1104 and 1105 is secured on the axle housing 1101, in positions separated from each other in the direction of the width of the body. A torsion-bartype stabilizer 1106 is coupled to the axle housing 1101 by means of bushes (not shown) by the brackets 1104 and 1105.

The stabilizer 1106 includes a right portion 1107 and a left portion 1108 which can be selectively coupled to each other by a coupling unit 1109. A protrusion 1117 and a hole 1118, which extend along an axis 1116, are respectively formed at the ends 1114 and 1115 of rods 1110 and 1112 opposite the arms 1111 and 1113 thereof, as shown in FIG. 16B. The protrusion 1117 and the hole 1118 are respectively constructed as a male screw and a female screw which are engaged with each other so as to couple the rods 1110 and 1112 rotatably relative to each other around the axis 1116. The tips of the arms 1111 and 1113 are coupled to brackets 1123 and 1124 secured on side frames 1121 and 1122 of the vehicle by links 1119 and 1120. As shown in FIG. 16C, the coupling unit 1109 includes a cylindrical clutch 1125, a clutch guide 1126 which is provided at one end 1114 of the rod 1110 and supports the clutch 1125 non-rotatably relative to the guide around the axis 1116 to permit movement back and forth along the axis, and a clutch bearer 1127 which is provided at the end 1115 of the rod 1112 and non-rotatably bears the clutch 1125 relative to the bearer around the axis 1116. The inside circumferential surface of the clutch 1125 includes planes 1128 and 1129 facing each other relative to the axis 1116 and extending in parallel with each other along the axis, and partially cylindrical surfaces 1130 and 1131 adjoining the planes in positions opposed to each other relative to the axis 1116, as shown in FIG. 16F. Corresponding to the inside circumferential surface of the clutch 1125, the peripheral surface of the clutch guide 1126 includes planes 1132 and 1133 facing each other on opposite sides of the axis 1116 and extending in parallel with each other, and partially cylindrical surfaces 1134 and 1135 adjoining the planes in position opposed to each other relative to the axis 1116. The peripheral surface of the clutch bearer 1127 include planes 1136 and 1137 facing each other relative to the axis 1116 and extending in parallel with each other along the axis, and partially cylindrical surfaces 1138 and 1139 adjoining the planes in position opposed to each other relative to the axis 1116, as shown in FIG. 16D of FIG. 16E.

When the planes 1132 and 1133 of the clutch guide 1126 are engaged with those 1128 and 1129 of the clutch 1125, as shown in FIG. 16F, the right portion 1107 and left portion 1108 of the stabilizer are integrally coupled to each other so as not to rotate along the axis 1116. As shown in Fig. 16E. The ends 1140 and 1141 of the planes 1136 and 1137 of the clutch bearer 1127 at the right portion 1107 of the stabilizer are chamfered. Thus, even if the rods 1110 and 1112 are slightly rotated with respect to each other around the axis 1116, the clutch 1125 can be moved from a position shown in FIG. 16B to a position shown in FIG. 16C, to couple the right portion 1107 and left portion 1108 of the stabilizer integrally to each other as the arms 1111 and 1113 of the portions are on the same plane.

The clutch 1125 is moved back and forth along the axis 1116 by an actuator 1142 controlled by the ECU 4. The actuator 1142 shown in FIG. 16 A includes a hydraulic piston cylinder unit 1143 secured on a differential casing (not shown in the drawing), and a shifting fork 1149. The fork 1149 has arms 1146 and 1147 engaged in grooves 1144 and 1145 of the peripheral surface of the clutch 1125, as shown in FIG. 16G, and is coupled to the piston rod 1148 of the piston-cylinder unit 1143 shown in FIG. 16A.

When the clutch 1125 is placed in a position shown in FIG. 16C by the actuator 1142 according to an instruction from the ECU 4, the right portion 1107 and left portion 1108 of the stabilizer 1106 are integrally coupled to each other to reduce the rolling of the vehicle, thus improving its control and stability. On the other hand, when the clutch 1125 is placed in a position shown in FIG. 16B by the actuator 1142, the right portion 1107 and left portion 1108 of the stabilizer 1106 can be rotated relative to each other around the axis 1116 to reduce the shock on the vehicle, and more particularly to reduce the shock one of the wheels, thus improving the riding comfort of the vehicle.

Figure 17A:
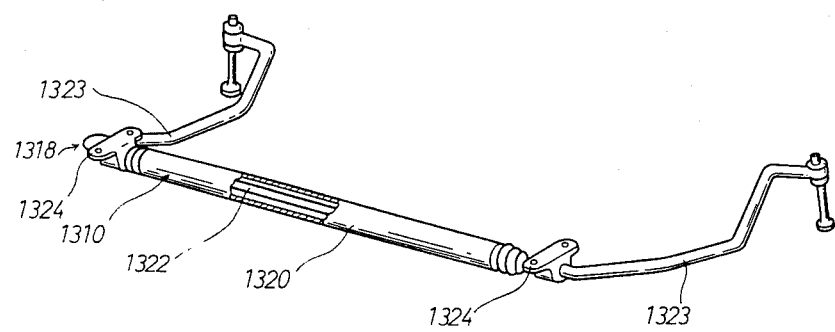
FIG. 17A is a perspective view of a fourth embodiment.
Figure 17B:
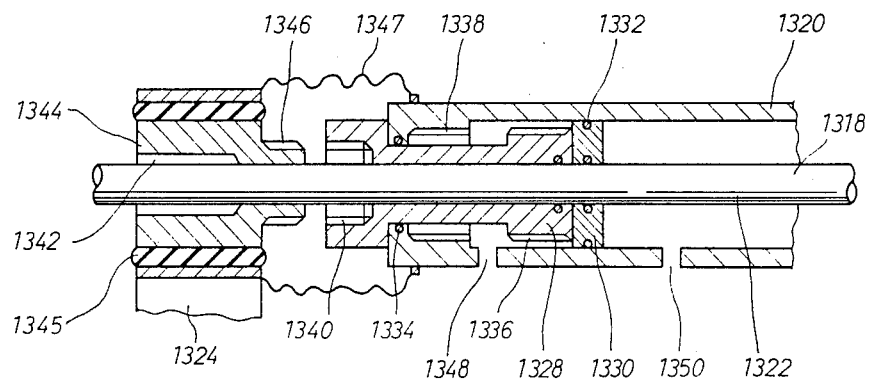
FIG. 17B is an enlarged sectional view showing a part of the fourth embodiment of FIG. 17A.

FIGS. 17A and 17B show another stabilizer as the fourth embodiment.

A stabilizer-bar-type assembly 1310 includes a first stabilizer bar 1318 and a second stabilizer bar 1320, as shown in FIG. 17A. The first stabilizer bar 1318 includes a main portion 1322 and an arm 1323. The main portion 1322 is attached to the body of a vehicle by a pair of fitting brackets 1324 so that the main portion 1322 can be twisted around its axis.

The second stabilizer bar 1320 is hollow so that the main portion 1322 of the first stabilizer bar 1318 extends through the second stabilizer bar, as shown in FIG. 17B. The second stabilizer bar 1320 is disposed inside the pair of fitting metals 1324 so that the first stabilizer bar 1318 can be connected to and disconnected from the second stabilizer. A piston 1330 on which a spool 1328 is secured is slidably fixed inside one end of the second stabilizer bar 1320 in such a manner that the piston is liquid-tightly sealed by a sealing member 1332. The spool 1328 is liquid-tightly sealed by a sealing member 1334, and projects out of the second stabilizer bar 1320. The spool 1328 has splines 1336 near the pistons 1330, while the second stabilizer bar 1320 has, at one end, splines 1338 which can be engaged with the splines 1336. The spool 1328 has other splines 1340 inside the outwardly projecting end thereof.

A coupler 1344 is connected to the main portion 1322 of the first stabilizer bar 1318 by splines 1342. The coupler 1344 is defined with the splines 1346 engageable with the spline 1340 extending from the spool 1328 and opposed thereto. The coupler 1344 is connected to a mounting bracket 1324 through a rubber bush 1345, as shown in FIG. 17B, so that the main portion 1322 of the first stabilizer bar 1318 is twisted by deforming the bush 1345. The coupler 1344 is fitted in such a position that the splines 1340 are engaged with the splines 1346 when the spool 1328 is moved leftward in the drawing, and the splines 1336 are engaged with the splines 1338. A bellows like boot 1347 for protecting the splines 1340 and 1346 from dust is provided between the coupler 1344 and the second stabilizer bar 1320.

Two ports 1348 and 1350 are provided in the second stabilizer bar 1320 in such a manner that the piston 1330 is located between the ports. Piping is provided to lead a pressure fluid to the ports 1348 and 1350 in use. When the pressure fluid is led to one port 1350 through an actuator such as a pressure control valve, the piston 1330 is moved leftward in the drawing, together with the spool 1328. Thus, the splines 1336 are engaged with the splines 1338, and the splines 1340 with the splines 1346. As a result, the first and the second stabilizer bars 1318 and 1320 are coupled to each other so as to raise the stiffness of the stabilizer bar assembly. On the contrary, when the pressure fluid is led to the other port 1348, the piston 1330 is moved rightward in the drawing. Thus, the splines are disengaged from each other. As a result, the stiffness of the stabilizer bar assembly is reduced.

Figure 18A:
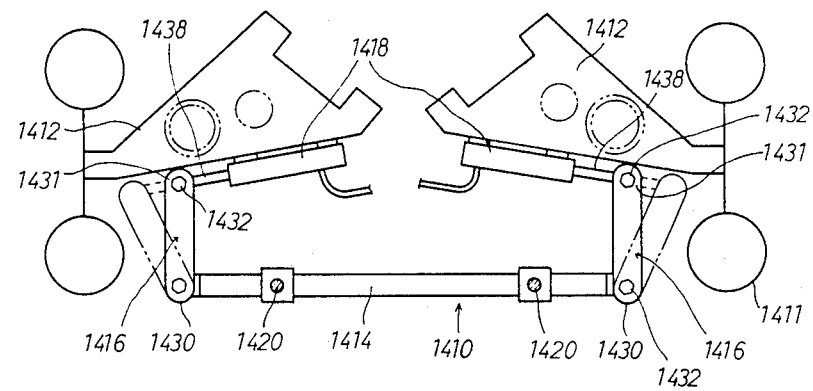
FIG. 18A is a schematic plan view of a fifth embodiment.
Figure 18B:
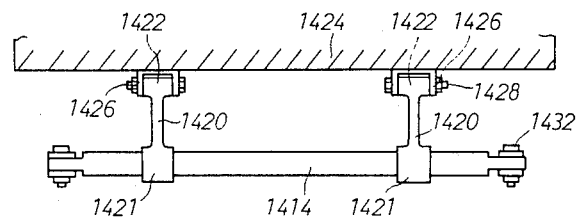
FIG. 18B is an explanatory view showing a part of FIG. 18A.
Figure 18C:
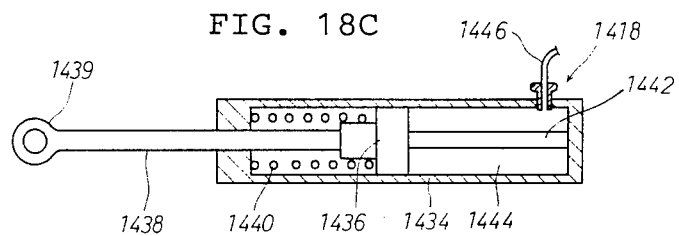
FIG. 18C is a sectional view of the extending part of FIG. 18A.

FIGS. 18A, 18B and 18C show three different views of still another stabilizer as the fifth embodiment.

FIG. 18A shows a schematic plan view of a stabilizer 1410. In the drawing, numeral 1411 denotes wheels and numeral 1412 denotes suspension arms. The stabilizer 1410 includes a main part 1414, a pair of arms 1416 and extending cylinders 1418. The main part 1414, which may be a round bar, is laid through bearing portions 1421 of a pair of links 1420 disposed at a certain distance apart from each other in the direction of the width of the body 1424 of a vehicle, and is supported by the bearing portions 1421 so that the main part 1414 can be twisted around its axis. The other bearing portions 1422 at the upper ends of the links 1420 are rotatably supported by pins 1428 extending through brackets 1426 welded on the vehicle body 1424. As a result, the main part 1414 is fixed along the width of the vehicle body, and can be twisted relative to the vehicle body.

The pair of arms 1416 are made of flat bars. The first ends 1430 of the arms 1416 are coupled to the ends of the main part 1414 by bolts and nuts 1432 so that the arms can be rotated around vertical axes. The second ends 1431 of the arms 1416 are located at a distance away from the first ends 1430 in the front-to-rear direction of the vehicle body 1424. The front-to-rear direction is an oblique longitudinal direction.

The second ends 1431 of the arms 1416 are displaced in the direction of the width of the vehicle body 1424 by the extending parts 1418 which may be power cylinders. Each of the power cylinders shown in FIG. 18C includes a cylinder 1434, a piston 1436 liquid-tightly and slidably fitted in the cylinder 1434 a piston rod 1438 coupled a one end to the piston 1436 and projecting at the other end out of the cylinder 1434, and a compressed spring 1440 for displacing the piston 1436 in such a direction as to contract the piston rod 1438. A stopper 1442 secured on the piston 1436 prevents the piston from being displaced more than a predetermined distance.

The cylinder 1434 is secured on the suspension arm 1412 in such a manner that the piston rod 1438 is located outside the cylinder 1434 in the direction of the width of the vehicle body. The second end 1431 of the arm 1416 is coupled to the outwardly projecting end 1439 of the piston rod 1438 by the bolt and nut 1432 so that the arm 1416 can be rotated around the vehicle axis.

One end of a flexible hose 1446 is connected to a fluid chamber 1444 of the cylinder 1434 opposite to the side on which the compressed spring 1440 is located. The other end of the flexible hose 1446 is connected to a pressure source (not shown in the drawings) through an actuator such as a pressure control valve. Unless pressure is applied to the fluid chambers 1444 of the power cylinders according to the state of the actuator instructed by the ECU 4, the second ends 1431 of the arms 1416 are located in relatively inner positions as shown in FIG. 18A, so that the wheel rate of the stabilizer is low.

On the contrary, when the actuator is operated by the ECU 4 to apply pressure to the fluid chambers 1444 of the power cylinders, the pressure acts to the pistons 1436 to push out the piston rods 1438 against the compressed springs 1440. As a result, the second ends 1431 of the arms 1416 are pushed out as indicated by imaginary lines, i.e., double dotted chain lines, in FIG. 18A, to increase the arm ratio of the stabilizer to heighten its stiffness against the rolling of the vehicle.

Figure 19A:
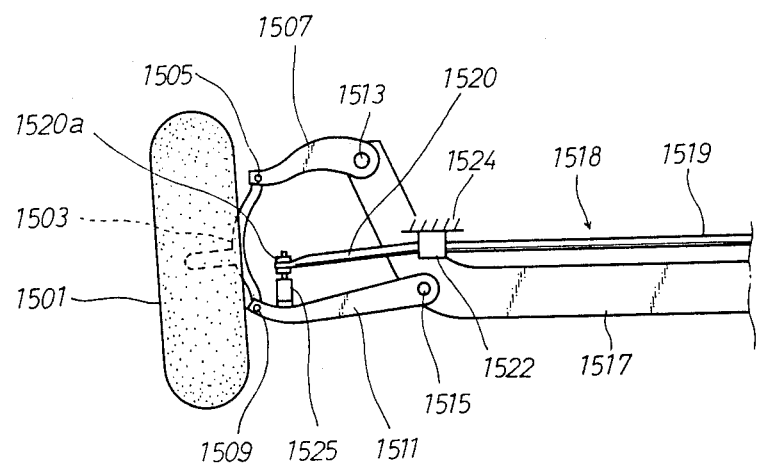
FIG. 19A is a front view showing a part of a sixth embodiment.
Figure 19B:
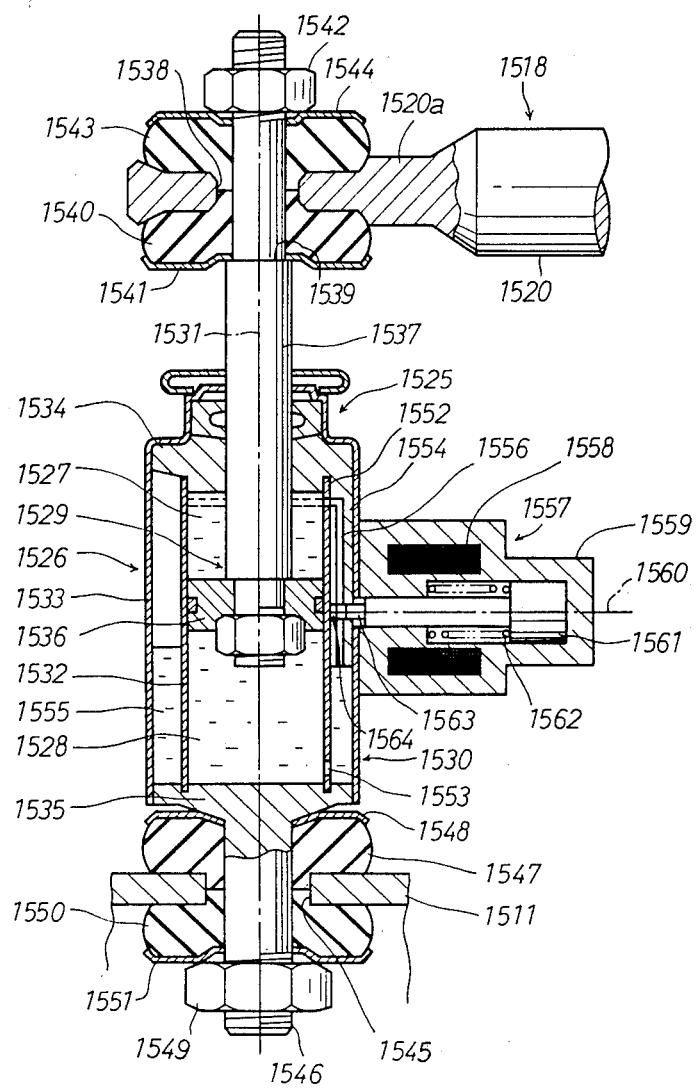
FIG. 19B is an enlarged sectional view of the coupling unit of FIG. 19A.

FIGS. 19A and 19B show a construction of a coupling unit for a stabilizer and a lower control arm, as the sixth embodiment.

FIG. 19A shows a partial front view of a wishbone-type suspension including a coupling unit for a stabilizer of a vehicle. FIG. 19B shows an enlarged sectional view of the coupling unit shown in FIG. 19A. In the drawings, a wheel 1501 is rotatably supported by a knuckle 1503. The knuckle 1503 is pivotally coupled at the upper end to one end of an upper control arm 1507 by means of a pivot 1505, and is pivotally coupled at the lower end to one end of the lower control arm 1511 by a pivot 1509. The upper control arm 1507 and the lower control arm 1511 are pivotally coupled to a cross member 1517 of the vehicle by pivots 1513 and 1515. A stabilizer 1518, which is shaped as a U, is disposed along the width of the vehicle as shown in FIG. 19A. The stabilizer 1518 is coupled at its central rod 1519 to the body 1524 of the vehicle by brackets 1522 by means of rubber bushes (not shown), so that the stabilizer can be rotated around its axis. The tip 1520a of an arm 1520 of the stabilizer 1518 are coupled to one portion near one end of the lower control arm 1511 by a coupling unit 1525. FIG. 19B shows the coupling unit 1525 including a piston-cylinder assembly 1526. The piston-cylinder assembly 1526 includes a piston 1529 and a cylinder 1530 which cooperate with each other to define two cylinder chambers 1527 and 1528. The cylinder 1530 includes an inner cylinder 1532 which supports the piston 1529 movably back and forth along an axis 1531, an outer cylinder 1533 disposed concentrically to the inner cylinder 1532, and end caps 1534 and 1535 which close both the ends of the inner cylinder and the outer cylinder. The piston 1529 includes a main portion 1536, and a piston rod 1537 which bears the main portion 1536 at one end thereof and extends along the axis 1531 through the end cap 1534 and the hole 1538 of the tip 1520a of the arm 1520 of the stabilizer 1518.

A rubber bush 1540 and a retainer 1541 for holding the bush are interposed between a shoulder 1539 of the piston rod 1537 and the tip 1520a. Another rubber bush 1543 and a retainer 1544 are interposed between the tip 1520a and a nut 1542 screwed on the front end of the piston rod 1537. As a result, the piston rod 1537 is coupled to the tip 1520a of the arm 1520 of the stabilizer 1518 so that an impulsive force is damped. A rod 1546, which extends along the axis 1531 through a hole 1545 of the lower control arm 1511, is secured on the end cap 1535. A rubber bush 1547 and a retainer 1548 for holding the bush are interposed between the end cap 1535 and the lower control arm 1511. Another rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped.

The inner cylinder 1532 is disposed with through holes 1552 and 1553 respectively near the end caps 1534 and 1535. The end cap 1534 is integrally provided with a projection 1554 which extends along the axis 1531 between the inner cylinder 1532 and the outer cylinder 1533 and being located in tight contact with the inner and the outer cylinders. The projection 1554 has an internal passage 1556 which is coincident at one end with the through hole 1552 and is opened at the other end into an annular space 1555 between the inner cylinder 1532 and the outer cylinder 1533. As a result, the through hole 1552, the internal passage 1556, the annular space 1555 an the other through hole 1553 define a passage means for connecting both the cylinder chambers 1527 and 1528 to each other. A part of the annular space 1555 is filled with air. The cylinder chambers 1527 and 1528, the internal passage 1556 and the remaining part of the annular 1555 are filled with oil. The change in the volume of the piston rod 1537 in the cylinder 1530, which is caused by the displacement of the piston 1529 from the cylinder 1530, is compensated by compression or expansion of the air filled in the part of the annular space 1555.

The communication of the internal passage 1556 is selectively controlled by a normally-opened solenoid valve 1557. The solenoid valve 1557 includes a housing 1559 including a solenoid 1558 and secured at one end on the outer cylinder 1533, a core 1561 supported in the housing 1559 for movement back and forth along an axis 1560, and a compressed helical spring 1562 which presses the core 1561 rightward in FIG. 19B. A valve element 1563 is integrally formed as one piece at one end of the core 1561 to be selectively fitted into a hole 1564 extending to penetrate the intenal passage 1556 of the projection 1554 in the horizontal direction.

When no electricity is applied to the solenoid 1558 according to an instruction from the ECU 4, the core 1561 is pressed rightward in the drawing by the compressed helical spring 1562 so as to open the valve 1557 to connect the internal passage 1556 with the core 1561. On the contrary, when electricity is applied to the solenoid 1558 according to an instruction from the ECU 4, the core 1561 is driven leftward in the drawing, against the force of the compressed helical spring 1562 so as to fit the valve element 1563 into the hole 1564 to isolate the internal passage 1556 from the core 1561.

In the coupling unit constructed as above, when electricity is applied to the solenoid 1558 of the solenoid valve 1557, the solenoid valve 1557 is closed so as to disconnect the cylinder chambers 1527 and 1528 from each other. Thus, oil in one cylinder chamber is kept from flowing to the other cylinder chamber, so that the piston 1529 is hindered from moving relative to the cylinder 1530 along the axis 1531. As a result, the stabilizer 1518 is worked for suppressing the rolling of the vehicle so as to keep good control and high stability of the vehicle even if one of the wheels rides over a bump or through a dip in a road surface.

On the other hand, when no electricity is applied to the solenoid 1558, the solenoid valve 1557 is maintained in an open position shown in FIG. 19B, so that oil in the cylinder chambers 1527 and 1528 can freely flow to each other via the internal passage 1556 and so forth. As a result, the piston 1529 can be smoothly moved in the cylinder 1530 so that the tips of both the right and left arms 1520 can be smoothly moved around the corresponding lower control arms 1511. For that reason, the stabilizer does not fulfill its function, so that the shock to each rear wheel of the vehicle is reduced to keep good riding comfort.

Although the invention has been described with reference to specific embodiments thereof, it will be apparent that numerous changes and modifications may be made therein without departing from the scope of the invention. It is, therefore, to be understood that it is not intended to limit the invention to the embodiment shown but only by the scope of the claims which follow.

What is claimed is:

1. A suspension controller for a vehicle having variable suspension means for controlling a distance between a body and a wheel axle of said vehicle, said controller comprising:
    vehicle height detection means for providing a vehicle height signal representative of said distance;
    vehicle speed detection means for providing a vehicle speed signal representative of a vehicle speed;
    vehicle height determination means for providing a first soft signal indicative of an alteration of said variable suspension means to a soft state when a change in said vehicle height signal within a predetermined period exceeds a predetermined value and said vehicle speed signal is within a predetermined speed range, said predetermined period being set such that said variable suspension means maybe altered before a rear wheel of said vehicle moving at said predetermined speed range reaches a front wheel position thereof;
    vehicle speed determination means for providing a hard signal representative of alteration of said variable suspension to a harder state when said vehicle speed signal exceeds a first reference speed signal and for providing a second soft signal representative of alteration of said variable suspension to softer state when said vehicle speed signal is less than a second reference speed signal which is set to be less than said first reference speed signal; and
    preference means responsive to said vehicle height determination means and said vehicle speed determination means for providing a preference for said first soft signal to said suspension means over said hard signal and said second soft signal when said vehicle speed signal is within an overlapped range in which said predetermined speed range overlaps a range between said second reference speed and said first reference speed.

2. Suspension controller according to claim 1 wherein said change in said vehicle height signal is determined as a function of maximum and minimum values of said vehicle height signal.

3. The suspension controller according to claim 1 wherein said vehicle height determination means includes memory means for storing a conversion table determination of said vehicle height signal in response to said distance.

4. The suspension controller according to claim 1 wherein said vehicle speed determination means includes memory means for storing a responsive table of a vehicle speed and said suspension characteristic and means for providing said hard and second soft signals in accordance with said table.

5. The suspension controller according to claim 1, wherein the vehicle height signal is a function of a displacement of said vehicle height from a standard value thereof.

6. A suspension controller according to claim 1, wherein the vehicle height signal is a function of a speed of the change in the vehicle height.

7. The suspension controller according to claim 1, wherein the vehicle height signal is a function of an acceleration of the change in the vehicle height.

8. The suspension controller according to claim 1 wherein said vehicle height signal is a function of an amplitude of the vibration of said vehicle height.

9. The suspension controller according to claim 1 including suspension characteristic alteration means responsive to said hard and soft signals, wherein said suspension characteristic alteration means alters a suspension characteristic by varying the spring constant of an air suspension.

10. The suspension controller according to claim 1 including suspension characteristic alteration means responsive to said hard and soft signals, wherein said suspension characteristic alteration means alters a suspension characteristic by varying a damping force of a shock absorber.

11. The suspension controller according to claim 1 including suspension characteristic means responsive to said hard and soft signals, wherein said suspension characteristic alteration means alters a suspension characteristic by varying compliance of a bush of the suspension.

12. The suspension controller according to claim 1 including suspension characteristic alteration means responsive to said hard and soft signals, wherein said suspension characteristic alteration means alters a suspension characteristic by varying a torsional stiffness of a stabilizer.

* * * * *